(12) United States Patent
Kannan et al.

(10) Patent No.: US 11,256,029 B2
(45) Date of Patent: Feb. 22, 2022

(54) PHOTONICS PACKAGING METHOD AND DEVICE

(71) Applicant: Lightmatter, Inc., Boston, MA (US)

(72) Inventors: Sukeshwar Kannan, Chelmsford, MA (US); Carl Ramey, Westborough, MA (US); Michael Gould, Boston, MA (US); Nicholas C. Harris, Boston, MA (US)

(73) Assignee: Lightmatter, Inc., Boston, MA (US)

( * ) Notice: Subject to any disclaimer, the term of this patent is extended or adjusted under 35 U.S.C. 154(b) by 0 days.

(21) Appl. No.: 16/653,159

(22) Filed: Oct. 15, 2019

(65) Prior Publication Data
US 2020/0116930 A1 Apr. 16, 2020

Related U.S. Application Data

(60) Provisional application No. 62/792,720, filed on Jan. 15, 2019, provisional application No. 62/745,533, filed on Oct. 15, 2018.

(51) Int. Cl.
*G02B 6/12* (2006.01)
*G02B 6/13* (2006.01)

(52) U.S. Cl.
CPC .......... *G02B 6/12004* (2013.01); *G02B 6/13* (2013.01); *G02B 2006/12142* (2013.01)

(58) Field of Classification Search
CPC .. G02B 6/12004; G02B 6/13; G02B 6/12142; G02B 6/30; G02B 6/122; G02B 6/12026; G02B 6/12002
See application file for complete search history.

(56) References Cited

U.S. PATENT DOCUMENTS

| | | | |
|---|---|---|---|
| 4,567,569 A | 1/1986 | Caulfield et al. |
| 4,633,428 A | 12/1986 | Byron |
| 5,004,309 A | 4/1991 | Caulfield et al. |
| 5,077,619 A | 12/1991 | Toms |

(Continued)

FOREIGN PATENT DOCUMENTS

| | | | |
|---|---|---|---|
| CN | 101630178 A | 1/2010 |
| WO | WO 2005/029404 A2 | 3/2005 |

(Continued)

OTHER PUBLICATIONS

International Search Report and Written Opinion from International Application No. PCT/US2019/056276 dated Mar. 11, 2020.

(Continued)

*Primary Examiner* — Ryan A Lepisto
*Assistant Examiner* — Erin D Chiem
(74) *Attorney, Agent, or Firm* — Wolf, Greenfield & Sacks, P.C.

(57) ABSTRACT

Photonic packages are described. One such photonic package includes a photonic chip, an application specific integrated circuit, and optionally, an interposer. The photonic chip includes photonic microelectromechanical system (MEMS) devices. A photonic package may include a material layer patterned to include recesses. The recesses are aligned with the photonic MEMS devices so as to form enclosed cavities around the photonic MEMS devices. This arrangement preserves the integrity of the photonic MEMS devices.

11 Claims, 26 Drawing Sheets

(56) References Cited

U.S. PATENT DOCUMENTS

| | | | |
|---|---|---|---|
| 5,095,459 | A | 3/1992 | Ohta et al. |
| 5,428,711 | A | 6/1995 | Akiyama et al. |
| 5,699,449 | A | 12/1997 | Javidi |
| 6,005,998 | A | 12/1999 | Lee |
| 6,392,233 | B1* | 5/2002 | Channin .................. G01J 5/40 250/234 |
| 7,173,272 | B2 | 2/2007 | Ralph |
| 7,660,533 | B1 | 2/2010 | Meyers et al. |
| 7,876,248 | B2 | 1/2011 | Berkley et al. |
| 7,985,965 | B2 | 7/2011 | Barker et al. |
| 8,018,244 | B2 | 9/2011 | Berkley |
| 8,023,828 | B2 | 9/2011 | Beausoleil et al. |
| 8,035,540 | B2 | 10/2011 | Berkley et al. |
| 8,190,553 | B2 | 5/2012 | Routt |
| 8,223,414 | B2 | 7/2012 | Goto |
| 8,386,899 | B2 | 2/2013 | Goto et al. |
| 8,427,738 | B2 | 4/2013 | Stievater et al. |
| 8,560,282 | B2 | 10/2013 | Macready et al. |
| 8,604,944 | B2 | 12/2013 | Berkley et al. |
| 8,620,855 | B2 | 12/2013 | Bonderson |
| 8,639,074 | B2 | 1/2014 | Tang et al. |
| 8,837,544 | B2 | 9/2014 | Santori |
| 9,250,391 | B2 | 2/2016 | McLaughlin et al. |
| 9,354,039 | B2 | 5/2016 | Mower et al. |
| 9,663,353 | B2* | 5/2017 | Ofner .................. B81B 7/008 |
| 9,791,258 | B2 | 10/2017 | Mower |
| 10,284,291 | B1* | 5/2019 | Ryan .................. H04B 10/803 |
| 10,359,272 | B2 | 7/2019 | Mower et al. |
| 2002/0197025 | A1 | 12/2002 | Vaganov et al. |
| 2003/0086138 | A1 | 5/2003 | Pittman et al. |
| 2003/0235363 | A1 | 12/2003 | Pfeiffer |
| 2004/0243657 | A1 | 12/2004 | Goren et al. |
| 2005/0013557 | A1 | 1/2005 | Lu |
| 2007/0180586 | A1 | 8/2007 | Amin |
| 2008/0031566 | A1 | 2/2008 | Matsubara et al. |
| 2008/0212186 | A1 | 9/2008 | Zoller et al. |
| 2008/0273835 | A1 | 11/2008 | Popovic |
| 2009/0028554 | A1 | 1/2009 | Anderson et al. |
| 2009/0154872 | A1 | 6/2009 | Sherrer et al. |
| 2011/0064948 | A1 | 3/2011 | Plaut et al. |
| 2012/0096956 | A1 | 4/2012 | Sabarinathan et al. |
| 2013/0011093 | A1 | 1/2013 | Goh et al. |
| 2014/0241657 | A1 | 8/2014 | Manouvrier |
| 2014/0299743 | A1 | 10/2014 | Miller |
| 2015/0354938 | A1 | 12/2015 | Mower et al. |
| 2015/0382089 | A1 | 12/2015 | Mazed |
| 2016/0103281 | A1 | 4/2016 | Matsumoto |
| 2016/0118106 | A1 | 4/2016 | Yoshimura et al. |
| 2016/0149662 | A1* | 5/2016 | Soldano .................. G02B 6/34 398/51 |
| 2016/0162798 | A1 | 6/2016 | Marandi et al. |
| 2016/0246001 | A1 | 8/2016 | Uchida et al. |
| 2016/0261093 | A1 | 9/2016 | Noda et al. |
| 2017/0031101 | A1 | 2/2017 | Miller |
| 2017/0047312 | A1 | 2/2017 | Budd et al. |
| 2017/0139146 | A1 | 5/2017 | Novack et al. |
| 2017/0285373 | A1 | 10/2017 | Zhang et al. |
| 2017/0351293 | A1 | 12/2017 | Carolan et al. |
| 2018/0088274 | A1 | 3/2018 | LeGrange et al. |
| 2018/0274900 | A1 | 9/2018 | Mower et al. |
| 2018/0335574 | A1 | 11/2018 | Steinbrecher et al. |
| 2019/0304936 | A1* | 10/2019 | Shaul .................. H01L 25/16 |
| 2020/0116930 | A1 | 4/2020 | Kannan et al. |
| 2020/0225555 | A1 | 7/2020 | Gould |

FOREIGN PATENT DOCUMENTS

| | | |
|---|---|---|
| WO | WO 2006/023067 A2 | 3/2006 |
| WO | WO 2008/069490 A1 | 6/2008 |
| WO | WO 2018/098230 A1 | 5/2018 |

OTHER PUBLICATIONS

International Search Report and Written Opinion from International Application No. PCT/US2015/034500, dated Mar. 15, 2016, 7 pages.

Invitation to Pay Additional Fees for International Application No. PCT/US2019/056276 dated Dec. 13, 2019.

Invitation to Pay Additional Fees for International Application No. PCT/US19/32133 dated Jul. 15, 2019.

International Search Report and Written Opinion for International Application No. PCT/US19/32133 dated Sep. 9, 2019.

Aaronson et al., Computational complexity of linear optics. Proceedings of the 43rd Annual ACM Symposium on Theory of Computing. 2011. 101 pages. ISBN 978-1-4503-0691-1.

Abu-Mostafa et al., Optical neural computers. Scientific American 256.3 (1987):88-95.

Albert et al., Statistical mechanics of com-plex networks. Reviews of Modern Physics. 2002;(74):47-97.

Almeida et al., All-optical control of light on a silicon chip. Nature. 2004;431:1081-1084.

Amir et al., Classical diffusion of a quantum particle in a noisy environment. Physical Review E. 2009;79. 5 pages. DOI: 10.1103/PhysRevE.79.050105.

Amit et al., Spin-glass models of neural networks. Physical Review A. 1985;32(2):1007-1018.

Anitha et al., Comparative Study of High performance Braun's multiplier using FPGAs. IOSR Journal of Electrontrics and Communication Engineering (IOSRJECE). 2012;1:33-37.

Appeltant et al., Information processing using a single dynamical node as complex system. Nature Communications. 2011. 6 pages. DOI: 10.1038/ncomms1476.

Arjovsky et al., Unitary Evolution Recurrent Neural Networks. arXiv: 1511.06464. 2016. 9 pages.

Aspuru-Guztk et al., Photonic quantum simulators. Nature Physics. 2012;8:285-291. DOI: 10.1038/NPHYS2253.

Aspuru-Guztk et al., Simulated Quantum Computation of Molecular Energies. Science. 2005;309:1704-7.

Atabaki et al., Integrating photonics with silicon nanoelectronics for the next generation of systems on a chip. Nature. 2018;556(7701):349-354. 10 pages. DOI: 10.1038/s41586-018-0028-z.

Baehr-Jones et al., A 25 GB/s Silicon Photonics Platform. arXiv: 1203.0767. 2012. 11 pages.

Bao et al., Atomic-Layer Graphene as a Saturable Absorber for Ultrafast Pulsed Lasers. 24 pages. 2009.

Bao et al., Monolayer graphene as a saturable absorber in a mode-locked laser. Nano Research. 2011;4:297-307. DOI: 10.1007/s12274-010-0082-9.

Barahona, On the computational complexity of Ising spin glass models. Journal of Physics A: Mathematical and General. 1982;15:3241-3253.

Bertsimas et al., Robust optimization with simulated annealing. Journal of Global Optimization. 2010;48:323-334. DOI: 10.1007/s10898-009-9496-x.

Bewick, Fast multiplication: algorithms and implementation. Ph.D. thesis, Stanford University. 1994.170 pages.

Bonneau et al., Quantum interference and manipulation of entanglement in silicon wire waveguide quantum circuits. New Journal of Physics. 2012;14:045003. 13 pages. DOI: 10.1088/1367-2630/14/4/045003.

Brilliantov, Effective magnetic Hamiltonian and Ginzburg criterion for fluids. Physical Review E. 1998;58:2628-2631.

Bromberg et al., Bloch oscillations of path-entangled photons. Physical Review Letters. 2010;105:263604-1-2633604-4. 4 pages. DOI: 10.1103/PhysRevLett. 105.263604.

Bromberg et al., Quantum and Classical Correlations in Waveguide Lattices. Physical Review Letters. 2009;102:253904-1-253904-4. 4 pages. DOI: 10.1103/PhysRevLett. 102.253904.

Broome et al., Photonic Boson Sampling in a Tunable Circuit. Science. 2012;339:794-8.

Bruck et al., On the power of neural networks for solving hard problems. American Institute of Physics. 1988. pp 137-143. 7 pages.

Canziani et al., Evaluation of neural network architectures for embedded systems. Circuits and Systems (ISCAS). 2017 IEEE International Symposium. 4 pages.

(56) References Cited

OTHER PUBLICATIONS

Cardenas et al., Low loss etchless silicon photonic waveguides. Optics Express. 2009;17(6):4752-4757.
Carolan et al., Universal linear optics. Science. 2015;349:711-716.
Caves, Quantum-mechanical noise in an interferometer. Physical Review D. 1981;23(8):1693-1708. 16 pages.
Centeno et al., Optical bistability in finite-size nonlinear bidimensional photonic crystals doped by a microcavity. Physical Review B. 2000;62(12):R7683-R7686.
Chan, Optical flow switching networks. Proceedings of the IEEE. 2012;100(5):1079-1091.
Chen et al., Compact, low-loss and low-power 8×8 broadband silicon optical switch. Optics Express. 2012;20(17):18977-18985.
Chen et al., DianNao: A small-footprint high-throughput accelerator for ubiquitous machine-learning. ACM Sigplan Notices. 2014;49:269-283.
Chen et al., Efficient photon pair sources based on silicon-on-insulator microresonators. Proc. of SPIE. 2010;7815. 10 pages.
Chen et al., Frequency-bin entangled comb of photon pairs from a Silicon-on-Insulator micro-resonator. Optics Express. 2011;19(2):1470-1483.
Chen et al., Universal method for constructing N-port nonblocking optical router based on 2×2 optical switch for photonic networks-on-chip. Optics Express. 2014;22(10);12614-12627. DOI: 10.1364/OE.22.012614.
Cheng et al., In-Plane Optical Absorption and Free Carrier Absorption in Graphene-on-Silicon Waveguides. IEEE Journal of Selected Topics in Quantum Electronics. 2014;20(1). 6 pages.
Chetlur et al., cuDNN: Efficient primitives for deep learning. arXiv preprint arXiv:1410.0759. 2014. 9 pages.
Childs et al., Spatial search by quantum walk. Physical Review A. 2004;70(2):022314. 11 pages.
Chung et al., A monolithically integrated large-scale optical phased array in silicon-on-insulator cmos. IEEE Journal of Solid-State Circuits. 2018;53:275-296.
Cincotti, Prospects on planar quantum computing. Journal of Lightwave Technology. 2009;27(24):5755-5766.
Clements et al., Optimal design for universal multiport interferometers. Optica. 2016;3(12):1460-1465.
Crespi et al., Integrated multimode interferometers with arbitrary designs for photonic boson sampling. Nature Photonics. 2013;7:545-549. DOI: 10.1038/NPHOTON.2013.112.
Crespi, et al., Anderson localization of entangled photons in an integrated quantum walk. Nature Photonics. 2013;7:322-328. DOI: 10.1038/NPHOTON.2013.26.
Dai et al., Novel concept for ultracompact polarization splitter-rotator based on silicon nanowires. Optics Express. 2011;19(11):10940-9.
Di Giuseppe et al., Einstein-Podolsky-Rosen Spatial Entanglement in Ordered and Anderson Photonic Lattices. Physical Review Letters. 2013;110:150503-1-150503-5. DOI:10.1103/PhysRevLett.110.150503.
Dunningham et al., Efficient comparison of path-lengths using Fourier multiport devices. Journal of Physics B: Atomic, Molecular and Optical Physics. 2006;39:1579-1586. DOI:10.1088/0953-4075/39/7/002.
Esser et al., Convolutional networks for fast, energy-efficient neuromorphic computing. Proceedings of the National Academy of Sciences. 2016:113(41):11441-11446.
Farhat et al., Optical implementation of the Hopfield model. Applied Optics. 1985;24(10):1469-1475.
Feinberg et al., Making memristive neural network accelerators reliable. IEEE International Symposium on High Performance Computer Architecture (HPCA). 2018. pp. 52-65. DOI 10.1109/HPCA.2018.00015.
Fushman et al., Controlled Phase Shifts with a Single Quantum Dot. Science. 2008;320:769-772. DOI: 10.1126/science.1154643.
George et al., A programmable and configurable mixed-mode FPAA SoC. IEEE Transactions on Very Large Scale Integration (VLSI) Systems. 2016;24:2253-2261.
Gilmer et al., Neural message passing for quantum chemistry. arXiv preprint arXiv:1704.01212. Jun. 2017. 14 pages.
Golub et al., Calculating the singular values and pseudo-inverse of a matrix. Journal of the Society for Industrial and Applied Mathematics Series B Numerical Analysis. 1965;2(2):205-224.
Graves et al., Hybrid computing using a neural network with dynamic external memory. Nature. 2016;538. 21 pages. DOI:10.1038/nature20101.
Grote et al., First long-term application of squeezed states of light in a gravitational-wave observatory. Physical Review Letter. 2013;110:181101. 5 pages. DOI:10.1103/PhysRevLett.110.181101.
Gruber et al., Planar-integrated optical vector-matrix multiplier. Applied Optics. 2000;39(29):5367-5373.
Gullans et al., Single-Photon Nonlinear Optics with Graphene Plasmons. Physical Review Letter. 2013;111:247401-1-247401-5. DOI: 10.1103/PhysRevLett.111.247401.
Gunn, CMOS photonics for high-speed interconnects. IEEE Micro. 2006;26:58-66.
Guo et al., Broadband wavelength conversion in a silicon vertical-dual slot waveguide. Optics Express. 2017;25(26):32964-71. 9 pages. DOI: 10.1364/OE.25.032964.
Haffner et al., Low-loss plasmon-assisted electro-optic modulator. Nature. 2018;556:483-486. 17 pages. DOI: 10.1038/s41586-018-0031-4.
Halasz et al., Phase diagram of QCD. Physical Review D. 1998;58:096007. 11 pages.
Hamerly et al., Scaling advantages of all-to-all connectivity in physical annealers: the Coherent Ising Machine vs. D-Wave 2000Q. arXiv preprints, May 2018. 17 pages.
Harris et al. Efficient, Compact and Low Loss Thermo-Optic Phase Shifter in Silicon. Optics Express. 2014;22(9);10487-93. DOI:10.1364/OE.22.010487.
Harris et al., Bosonic transport simulations in a large-scale programmable nanophotonic processor. arXiv:1507.03406. 2015. 8 pages.
Harris et al., Integrated source of spectrally filtered correlated photons for large-scale quantum photonic systems. Physical Review X. 2014;4:041047. 10 pages. DOI: 10.1103/PhysRevX.4.041047.
Harris et al., Quantum transport simulations in a programmable nanophotonic processor. Nature Photonics. 2017;11:447-452. DOI: 10.1038/NPHOTON.2017.95.
Hinton et al., Reducing the dimensionality of data with neural networks. Science. 2006;313:504-507.
Hochberg et al., Silicon Photonics: The Next Fabless Semiconductor Industry. IEEE Solid-State Circuits Magazine. 2013. pp 48-58. DOI: 10.1109/MSSC.2012.2232791.
Honerkamp-Smith et al., An introduction to critical points for biophysicists; observations of compositional heterogeneity in lipid membranes. Biochimica et Biophysica Acta (BBA). 2009;1788:53-63. DOI: 10.1016/j.bbamem.2008.09.010.
Hong et al., Measurement of subpicosecond time intervals between two photons by interference. Physical Review Letters. 1987;59(18):2044-2046.
Hopfield et al., Neural computation of decisions in optimization problems. Biological Cybernetics. 1985;52;141-152.
Hopfield, Neural networks and physical systems with emergent collective computational abilities. PNAS. 1982;79:2554-2558. DOI: 10.1073/pnas.79.8.2554.
Horowitz, Computing's energy problem (and what we can do about it). Solid-State Circuits Conference Digest of Technical Papers (ISSCC), 2014 IEEE International. 5 pages.
Horst et al., Cascaded Mach-Zehnder wavelength filters in silicon photonics for low loss and flat pass-band WDM (de-)multiplexing. Optics Express. 2013;21(10):11652-8. DOI:10.1364/OE.21.011652.
Humphreys et al., Linear Optical Quantum Computing in a Single Spatial Mode. Physical Review Letters. 2013;111:150501. 5 pages. DOI: 10.1103/PhysRevLett. 111.150501.
Inagaki et al., Large-scale ising spin network based on degenerate optical parametric oscillators. Nature Photonics. 2016;10:415-419. 6 pages. DOI: 10.1038/NPHOTON.2016.68.
Isichenko, Percolation, statistical topography, and trans-port in random media. Reviews of Modern Physics. 1992;64(4):961-1043.

(56) References Cited

OTHER PUBLICATIONS

Jaekel et al., Quantum limits in interferometric measurements. Europhysics Letters. 1990;13(4):301-306.

Jalali et al., Silicon Photonics. Journal of Lightwave Technology. 2006;24(12):4600-15. DOI: 10.1109/JLT.2006.885782.

Jia et al., Caffe: Convolutional architecture for fast feature embedding. Proceedings of the 22nd ACM International Conference on Multimedia. Nov. 2014. 4 pages. URL:http://doi.acm.org/10.1145/2647868.2654889.

Jiang et al., A planar ion trapping microdevice with integrated waveguides for optical detection. Optics Express. 2011;19(4):3037-43.

Jonsson, An empirical approach to finding energy efficient ADC architectures. 2011 International Workshop on ADC Modelling, Testing and Data Converter Analysis and Design and IEEE 2011 ADC Forum. 6 pages.

Jouppi et al. In-datacenter performance analysis of a tensor processing unit. Proceeding of Computer Architecture (ISCA). Jun. 2017. 12 pages. URL:https://doi.org/10.1145/3079856.3080246.

Kahn et al., Communications expands its space. Nature Photonics. 2017;11:5-8.

Kardar et al., Dynamic Scaling of Growing Interfaces. Physical Review Letters. 1986;56(9):889-892.

Karpathy, CS231n Convolutional Neural Networks for Visual Recognition. Class notes. 2019. URL:http://cs231n.github.io/ 2 pages, [last accessed Sep. 24, 2019].

Keckler et al., GPUs and the future of parallel computing. IEEE Micro. 2011;31:7-17. DOI: 10.1109/MM.2011.89.

Kteling et al., On photonic Controlled Phase Gates. New Journal of Physics. 2010;12:0133003. 17 pages. DOI: 10.1088/1367-2630/12/1/013003.

Kilper et al., Optical networks come of age. Optics Photonics News. 2014;25:50-57. DOI: 10.1364/OPN.25.9.000050.

Kim et al., A functional hybrid memristor crossbar-array/cmos system for data storage and neuromorphic applications. Nano Letters. 2011;12:389-395.

Kirkpatrick et al., Optimization by simulated annealing. Science. 1983;220(4598):671-680.

Knill et al., A scheme for efficient quantum computation with linear optics. Nature. 2001;409(4652):46-52.

Knill et al., The Bayesian brain: the role of uncertainty in neural coding and computation. Trends in Neurosciences. 2004;27(12):712-719.

Knill, Quantum computing with realistically noisy devices. Nature. 2005;434:39-44.

Kok et al., Linear optical quantum computing with photonic qubits. Reviews of Modern Physics. 2007;79(1):135-174.

Koos et al., Silicon-organic hybrid (SOH) and plasmonic-organic hybrid (POH) integration. Journal of Lightwave Technology. 2016;34(2):256-268.

Krizhevsky et al., ImageNet classification with deep convolutional neural networks. Advances in Neural Information Processing Systems (NIPS). 2012. 9 pages.

Kucherenko et al., Application of Deterministic Low-Discrepancy Sequences in Global Optimization. Computational Optimization and Applications. 2005;30:297-318.

Kwack et al., Monolithic InP strictly non-blocking 8x8 switch for high-speed WDM optical interconnection. Optics Express. 2012;20(27):28734-41.

Lahini et al., Anderson Localization and Nonlinearity in One-Dimensional Disordered Photonic Lattices. Physical Review Letters. 2008;100:013906. 4 pages. DOI: 10.1103/PhysRevLett.100.013906.

Lahini et al., Quantum Correlations in Two-Particle Anderson Localization. Physical Review Letters. 2010; 105:163905. 4 pages. DOI: 10.1103/PhysRevLett.105.163905.

Laing et al., High-fidelity operation of quantum photonic circuits. Applied Physics Letters. 2010;97:211109. 5 pages. DOI: 10.1063/1.3497087.

Landauer, Irreversibility and heat generation in the computing process. IBM Journal of Research and Development. 1961. pp 183-191.

Lanyon et al., Towards quantum chemistry on a quantum computer. Nature Chemistry. 2010;2:106-10. DOI: 10.1038/NCHEM.483.

Lawson et al., Basic linear algebra subprograms for Fortran usage. ACM Transactions on Mathematical Software (TOMS). 1979;5(3):308-323.

Lecun et al., Deep learning. Nature. 2015;521:436-444. DOI:10.1038/nature14539.

Lecun et al., Gradient-based learning applied to document recognition. Proceedings of the IEEE. Nov. 1998. 46 pages.

Levi et al., Hyper-transport of light and stochastic acceleration by evolving disorder. Nature Physics. 2012;8:912-7. DOI: 10.1038/NPHYS2463.

Li et al., Efficient and self-adaptive in-situ learning in multilayer memristor neural networks. Nature Communications. 2018;9:2385. 8 pages. DOI: 10.1038/s41467-018-04484-2.

Lin et al., All-optical machine learning using diffractive deep neural networks. Science. 2018;361:1004-1008. 6 pages. DOI: 10.1126/science.aat8084.

Little, The existence of persistent states in the brain. Mathematical Biosciences. 1974;19:101-120.

Liu et al., Nano-opto-electro-mechanical switch based on a four-waveguide directional coupler. Optics Express. 2017;25(9):10166-76. 11 pages.

Lu et al., 16 × 16 non-blocking silicon optical switch based on electro-optic Mach-Zehnder interferometers. Optics Express. 2016:24(9):9295-9307. DOI: 10.1364/OE.24.009295.

Ma et al., Optical switching technology comparison: Optical mems vs. Other technologies. IEEE Optical Communications. 2003;41(11):S16-S23.

Macready et al., Criticality and Parallelism in Combinatorial Optimization. Science. 1996;271:56-59.

Marandi et al., Network of time-multiplexed optical parametric oscillators as a coherent Ising machine. Nature Photonics. 2014;8:937-942. DOI: 10.1038/NPHOTON.2014.249.

Martin-Lopez et al., Experimental realization of Shor's quantum factoring algorithm using qubit recycling. Nature Photonics. 2012;6:773-6. DOI: 10.1038/NPHOTON.2012.259.

Mcmahon et al., A fully programmable 100-spin coherent Ising machine with all-to-all connections. Science. 2016;354(6312):614-7. DOI: 10.1126/science.aah5178.

Mead, Neuromorphic electronic systems. Proceedings of the IEEE. 1990;78(10):1629-1636.

Migdall et al., Tailoring single-photon and multiphoton probabilities of a single-photon on-demand source. Physical Review A. 2002;66:053805. 4 pages. DOI: 10.1103/PhysRevA.66.053805.

Mikkelsen et al., Dimensional variation tolerant silicon-on-insulator directional couplers. Optics Express. 2014;22(3):3145-50. DOI:10.1364/OE.22.003145.

Miller, Are optical transistors the logical next step? Nature Photonics. 2010;4:3-5.

Miller, Attojoule optoelectronics for low-energy information processing and communications. Journal of Lightwave Technology. 2017;35(3):346-96. DOI: 10.1109/JLT.2017.2647779.

Miller, Energy consumption in optical modulators for interconnects. Optics Express. 2012;20(S2):A293-A308.

Miller, Perfect optics with imperfect components. Optica. 2015;2(8):747-750.

Miller, Reconfigurable add-drop multiplexer for spatial modes. Optics Express. 2013;21(17):20220-9. DOI: 10.1364/OE.21.020220.

Miller, Self-aligning universal beam coupler, Optics Express. 2013;21(5):6360-70.

Miller, Self-configuring universal linear optical component [Invited]. Photonics Research. 2013;1(1):1-15. URL:http://dx.doi.org/10.1364/PRJ.1.000001.

Misra et al., Artificial neural networks in hardware: A survey of two decades of progress. Neurocomputing. 2010;74:239-255.

Mohseni et al., Environment-assisted quantum walks in photosynthetic complexes. The Journal of Chemical Physics. 2008;129:174106. 10 pages. DOI: 10.1063/1.3002335.

(56) References Cited

OTHER PUBLICATIONS

Moore, Cramming more components onto integrated circuits. Proceeding of the IEEE. 1998;86(1):82-5.
Mower et al., Efficient generation of single and entangled photons on a silicon photonic integrated chip. Physical Review A. 2011;84:052326. 7 pages. DOI: 10.1103/PhysRevA.84.052326.
Mower et al., High-fidelity quantum state evolution in imperfect photonic integrated circuits. Physical Review A. 2015;92(3):032322. 7 pages. DOI: 10.1103/PhysRevA.92.032322.
Nagamatsu et al., A 15 NS 32×32-bit CMOS multiplier with an improved parallel structure. IEEE Custom Integrated Circuits Conference. 1989. 4 pages.
Najafi et al., On-Chip Detection of Entangled Photons by Scalable Integration of Single-Photon Detectors. arXiv:1405.4244. May 16, 2014. 27 pages.
Najafi et al., On-Chip detection of non-classical light by scalable integration of single-photon detectors. Nature Communications. 2015;6:5873. 8 pages. DOI: 10.1038/ncomms6873.
Naruse, Nanophotonic Information Physics. Nanointelligence and Nanophotonic Computing. Springer. 2014. 261 pages. DOI 10.1007/978-3-642-40224-1.
Nozaki et al., Sub-femtojoule all-optical switching using a photonic-crystal nanocavity. Nature Photonics. 2010;4:477-483. DOI: 10.1038/NPHOTON.2010.89.
O'Brien et al., Demonstration of an all-optical quantum controlled-NOT gate. Nature. 2003;426:264-7.
Onsager, Crystal Statistics. I. A Two-Dimensional Model with an Order-Disorder Transition. Physical Review. 1944;65(3,4):117-149.
Orcutt et al., Nanophotonic integration in state-of-the-art CMOS foundries. Optics Express. 2011;19(3):2335-46.
Pelissetto et al., Critical phenomena and renormalization-group theory. Physics Reports. Apr. 2002. 150 pages.
Peng, Implementation of AlexNet with Tensorflow. https://github.com/ykpengba/AlexNet-A-Practical-Implementation. 2018. 2 pages, [last accessed Sep. 24, 2019].
Peretto, Collective properties of neural networks: A statistical physics approach. Biological Cybernetics. 1984;50:51-62.
Pernice et al., High-speed and high-efficiency travelling wave single-photon detectors embedded in nanophotonic circuits. Nature Communications 2012;3:1325. 10 pages. DOI: 10.1038/ncomms2307.
Peruzzo et al., Quantum walk of correlated photons. Science. 2010;329;1500-3. DOI: 10.1126/science.1193515.
Peters et al., Suspended photonic waveguide arrays for submicrometer alignment. SPIE 2014;9133(10):913317. 10 pages.
Politi et al., Integrated Quantum Photonics, IEEE Journal of Selected Topics in Quantum Electronics, 2009;5(6):1-12. DOI: 10.1109/JSTQE.2009.2026060.
Politi et al., Silica-on-Silicon Waveguide Quantum Circuits. Science. 2008;320:646-9. DOI: 10.1126/science.1155441.
Poon et al., Neuromorphic silicon neurons and large-scale neural networks: challenges and opportunities. Frontiers in Neuroscience. 2011;5:1-3. DOI: 10.3389/fnins.2011.00108.
Prucnal et al., Recent progress in semiconductor excitable lasers for photonic spike processing. Advances in Optics and Photonics. 2016;8(2):228-299.
Psaltis et al., Holography in artificial neural networks. Nature. 1990;343:325-330.
Qiao et al., 16×16 non-blocking silicon electro-optic switch based on mach zehnder interferometers. Optical Fiber Communication Conference. Optical Society of America. 2016. 3 pages.
Ralph et al., Linear optical controlled-NOT gate in the coincidence basis. Physical Review A. 2002;65:062324-1-062324-5. DOI: 10.1103/PhysRevA.65.062324.
Ramanitra et al., Scalable and multi-service passive optical access infrastructure using variable optical splitters. Optical Fiber Communication Conference. Optical Society of America. 2005. 3 pages.
Raussendorf et al., A one-way quantum computer. Physical Review Letter. 2001;86(22):5188-91. DOI: 10.1103/PhysRevLett.86.5188.
Rechtsman et al., Photonic floquet topological insulators. Nature. 2013;496:196-200. doi: 10.1038/nature12066.
Reck et al., Experimental realization of any discrete unitary operator. Physical review letters. 1994;73(1):58-61. 6 pages.
Reed et al., Silicon optical modulators. Nature Photonics. 2010;4:518-26. DOI: 10.1038/NPHOTON.2010.179.
Rendl et al., Solving Max-Cut to optimality by intersecting semidefinite and polyhedral relaxations. Mathematical Programming. 2010;121:307-335. DOI: 10.1007/s10107-008-0235-8.
Rios et al., Integrated all-photonic non-volatile multilevel memory. Nature Photonics. 2015;9:725-732. DOI: 10.1038/NPHOTON.2015.182.
Rogalski, Progress in focal plane array technologies. Progress in Quantum Electronics. 2012;36:342-473.
Rohit et al., 8×8 space and wavelength selective cross-connect for simultaneous dynamic multi-wavelength routing. Optical Fiber Communication Conference. OFC/NFOEC Technical Digest. 2013. 3 pages.
Rosenblatt, The perceptron: a probabilistic model for information storage and organization in the brain. Psychological Review. 1958;65(6):386-408.
Russakovsky et al., ImageNet Large Scale Visual Recognition Challenge. arXiv:1409.0575v3. Jan. 2015. 43 pages.
Saade et al., Random projections through multiple optical scattering: Approximating Kernels at the speed of light. arXiv:1510.06664v2. Oct. 25, 2015. 6 pages.
Salandrino et al., Analysis of a three-core adiabatic directional coupler. Optics Communications. 2009;282:4524-6. DOI:10.1016/j.optcom.2009.08.025.
Schaeff et al., Scalable fiber integrated source for higher-dimensional path-entangled photonic quNits. Optics Express. 2012;20(15):16145-153.
Schirmer et al., Nonlinear mirror based on two-photon absorption. Journal of the Optical Society of America B. 1997; 14(11):2865-8.
Schmidhuber, Deep learning in neural networks: An overview. Neural Networks. 2015;61:85-117.
Schreiber et al., Decoherence and Disorder in Quantum Walks: From Ballistic Spread to Localization. Physical Review Letters. 2011;106:180403. 4 pages. DOI: 10.1103/PhysRevLett.106.180403.
Schwartz et al., Transport and Anderson localization in disordered two-dimensional photonic lattices. Nature. 2007;446:52-5. DOI:10.1038/nature05623.
Selden, Pulse transmission through a saturable absorber. British Journal of Applied Physics. 1967;18:743-8.
Shafiee et al., ISAAC: A convolutional neural network accelerator with in-situ analog arithmetic in crossbars. ACM/IEEE 43rd Annual International Symposium on Computer Architecture. Oct. 2016. 13 pages.
Shen et al., Deep learning with coherent nanophotonic circuits. Nature Photonics. 2017;11:441-6. DOI: 10.1038/NPHOTON.2017.93.
Shoji et al., Low-crosstalk 2×2 thermo-optic switch with silicon wire waveguides. Optics Express.2010;18(9):9071-5.
Silver et al. Mastering chess and shogi by self-play with a general reinforcement learning algorithm. arXiv preprint arXiv:1712.01815. 19 pages. 2017.
Silver et al., Mastering the game of go with deep neural networks and tree search. Nature. 2016;529:484-9. 20 pages. DOI:10.1038/nature16961.
Silver et al., Mastering the game of Go without human knowledge. Nature. 2017;550:354-9. 18 pages. DOI:10.1038/nature24270.
Silverstone et al., On-chip quantum interference between silicon photon-pair sources. Nature Photonics. 2014;8:104-8. DOI: 10.1038/NPHOTON.2013.339.
Smith et al., Phase-controlled integrated photonic quantum circuits. Optics Express. 2009;17(16):13516-25.
Soljacic et al., Optimal bistable switching in nonlinear photonic crystals. Physical Review E. vol. 66, p. 055601, Nov. 2002. 4 pages.
Solli et al., Analog optical computing. Nature Photonics. 2015;9:704-6.
Spring et al., Boson sampling on a photonic chip. Science. 2013;339:798-801. DOI: 10.1126/science.1231692.

(56) References Cited

OTHER PUBLICATIONS

Srinivasan et al., 56 GB/s germanium waveguide electro-absorption modulator. Journal of Lightwave Technology. 2016;34(2):419-24. DOI: 10.1109/JLT.2015.2478601.

Steinkraus et al., Using GPUs for machine learning algorithms. Proceedings of the 2005 Eight International Conference on Document Analysis and Recognition. 2005. 6 pages.

Suda et al., Quantum interference of photons in simple networks. Quantum Information Process. 2013;12:1915-45. DOI: 10.1007/s11128-012-0479-3.

Sun et al., Large-scale nanophotonic phased array. Nature. 2013;493:195-9. DOI: 10.1038/nature11727.

Sun et al., Single-chip microprocessor that communicates directly using light. Nature. 2015;528:534-8. DOI: 10.1038/nature16454.

Suzuki et al., Ultra-compact 8×8 strictly-non-blocking Si-wire PILOSS switch. Optics Express. 2014;22(4):3887-94. DOI: 10.1364/OE.22.003887.

Sze et al., Efficient processing of deep neural networks: A tutorial and survey. Proceedings of the IEEE. 2017;105(12):2295-2329. DOI: 10.1109/JPROC.2017.276174.

Tabia, Experimental scheme for qubit and qutrit symmetric informationally complete positive operator-valued measurements using multiport devices. Physical Review A. 2012;86:062107. 8 pages. DOI: 10.1103/PhysRevA.86.062107.

Tait et al., Broadcast and weight: An integrated network for scalable photonic spike processing. Journal of Lightwave Technology. 2014;32(21):3427-39. DOI: 10.1109/JLT.2014.2345652.

Tait et al., Chapter 8 Photonic Neuromorphic Signal Processing and Computing. Springer, Berlin, Heidelberg. 2014. pp. 183-222.

Tait et al., Neuromorphic photonic networks using silicon photonic weight banks. Scientific Reports. 2017;7:7430. 10 pages.

Tanabe et al., Fast bistable all-optical switch and memory on a silicon photonic crystal on-chip. Optics Letters. 2005;30(19):2575-7.

Tanizawa et al., Ultra-compact 32×32 strictly-non-blocking Si-wire optical switch with fan-out LGA interposer. Optics Express. 2015;23(13):17599-606. DOI:10.1364/OE.23.017599.

Thompson et al., Integrated waveguide circuits for optical quantum computing. IET Circuits, Devices, & Systems. 2011;5(2):94-102. DOI: 10.1049/iet-cds.2010.0108.

Timurdogan et al., An ultralow power athermal silicon modulator. Nature Communications. 2014;5:4008. 11 pages. DOI: 10.1038/ncomms5008.

Vandoorne et al., Experimental demonstration of reservoir computing on a silicon photonics chip. Nature Communications. 2014;5:3541. 6 pages. DOI: 10.1038/ncomms4541.

Vazquez et al., Optical NP problem solver on laser-written waveguide plat-form. Optics Express. 2018;26(2):702-10.

Vivien et al., Zero-bias 40gbit/s germanium waveguide photodetector on silicon. Optics Express. 2012;20(2):1096-1101.

Wang et al., Coherent Ising machine based on degenerate optical parametric oscillators. Physical Review A. 2013;88:063853. 9 pages. DOI: 10.1103/PhysRevA.88.063853.

Wang et al., Deep learning for identifying metastatic breast cancer. arXiv preprint arXiv:1606.05718. Jun. 18, 2016. 6 pages.

Werbos, Beyond regression: New tools for prediction and analysis in the behavioral sciences. Ph.D. dissertation, Harvard University. Aug. 1974. 454 pages.

Whitfield et al., Simulation of electronic structure Hamiltonians using quantum computers. Molecular Physics. 2010;109(5,10):735-50. DOI: 10.1080/00268976.2011.552441.

Wu et al., An optical fiber network oracle for NP-complete problems. Light: Science & Applications. 2014;3: e147. 5 pages. DOI: 10.1038/1sa.2014.28.

Xia et al., Mode conversion losses in silicon-on-insulator photonic wire based racetrack resonators. Optics Express. 2006;14(9):3872-86.

Xie et al., Terahertz integrated device: high-Q silicon dielectric resonators. Optical Materials Express. 2017;8(1):50-8. 9 pages.

Xu et al., Experimental observations of bistability and instability in a two-dimensional nonlinear optical superlattice. Physical Review Letters. 1993;71(24):3959-62.

Yang et al., Non-Blocking 4×4 Electro-Optic Silicon Switch for On-Chip Photonic Networks. Optics Express 2011;19(1):47-54.

Yao et al., Serial-parallel multipliers. Proceedings of 27th Asilomar Conference on Signals, Systems and Computers. 1993. pp. 359-363.

Young et al., Recent trends in deep learning based natural language processing. IEEE Computational Intelligence Magazine. arXiv:1708.02709v8. Nov. 2018. 32 pages.

Zhou et al., Calculating Unknown Eigenvalues with a Quantum Algorithm. Nature Photonics. 2013;7:223-8. DOI: 10.1038/NPHOTON.2012.360.

PCT/US2019/056276, dated Mar. 11, 2020, International Search Report and Written Opinion.

PCT/US2015/034500, dated Mar. 15, 2016, International Search Report and Written Opinion.

PCT/US2019/056276, Dec. 13, 2019, Invitation to Pay Additional Fees.

PCT/US19/32133, Jul. 15, 2019, Invitation to Pay Additional Fees.

PCT/US19/32133, dated Sep. 9, 2019, International Search Report and Written Opinion.

\* cited by examiner

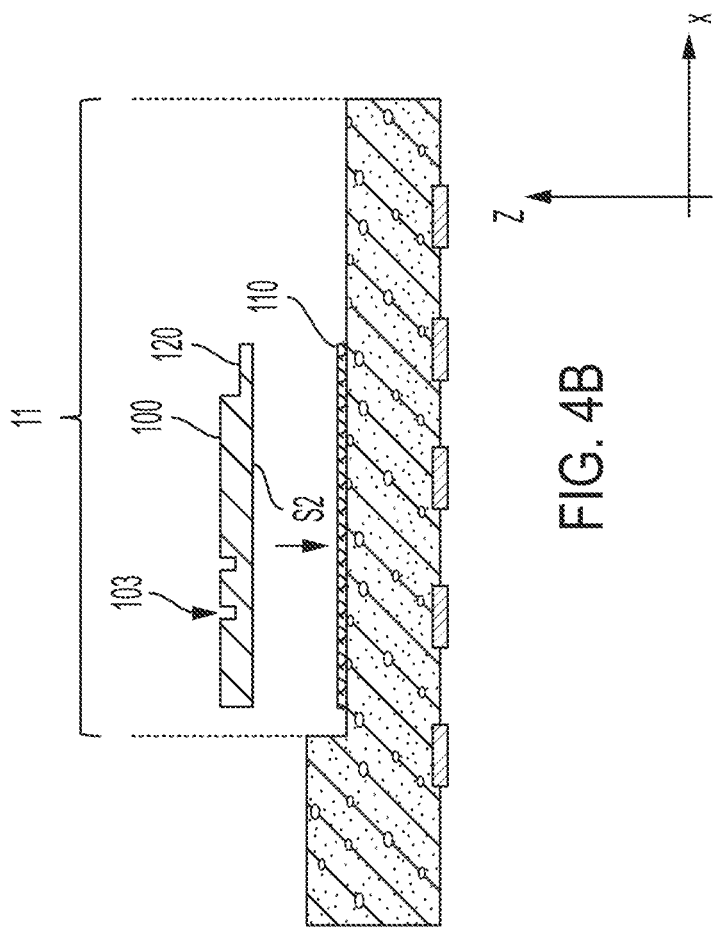
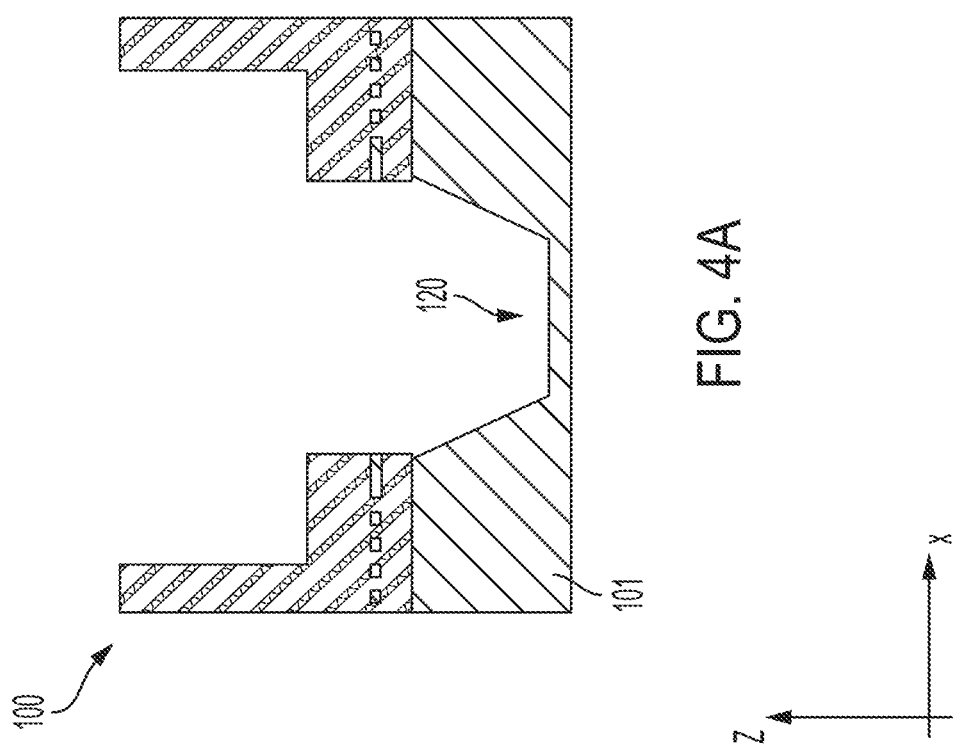
FIG. 4A
FIG. 4B

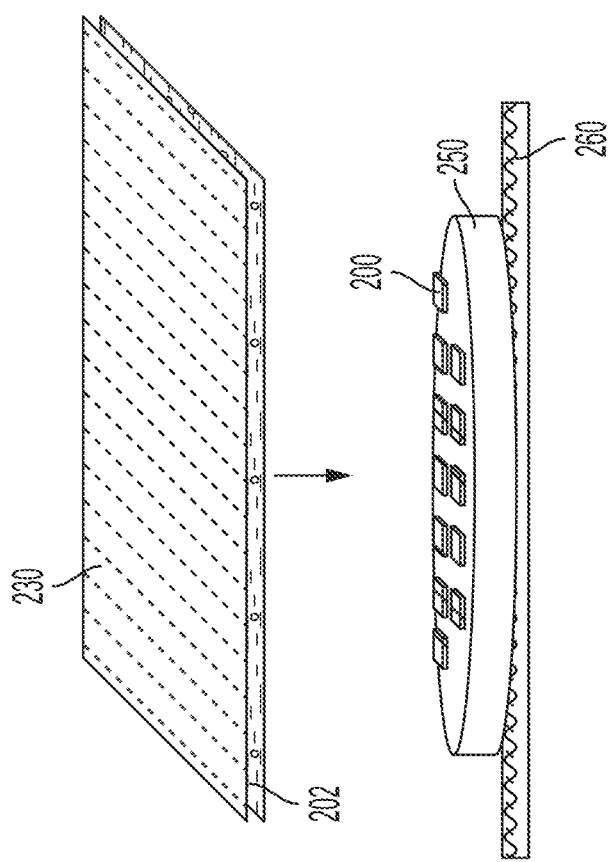

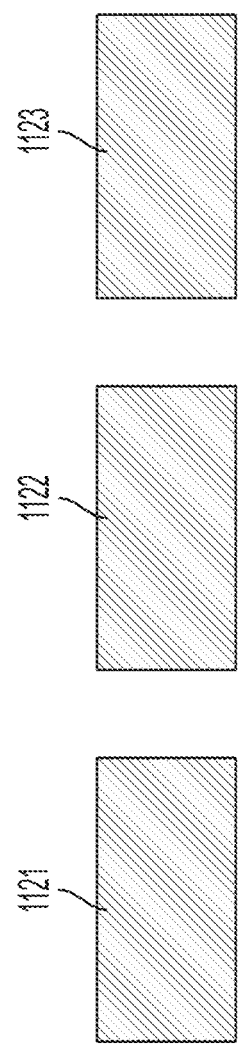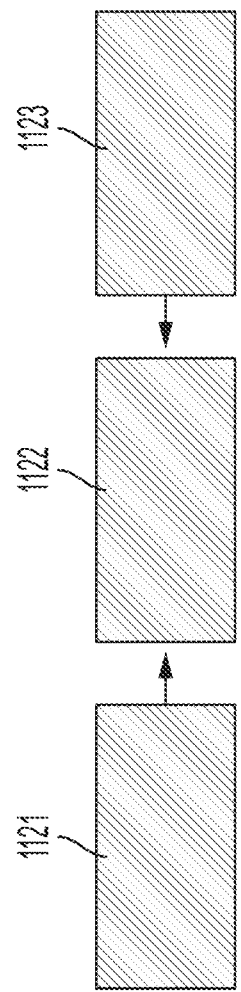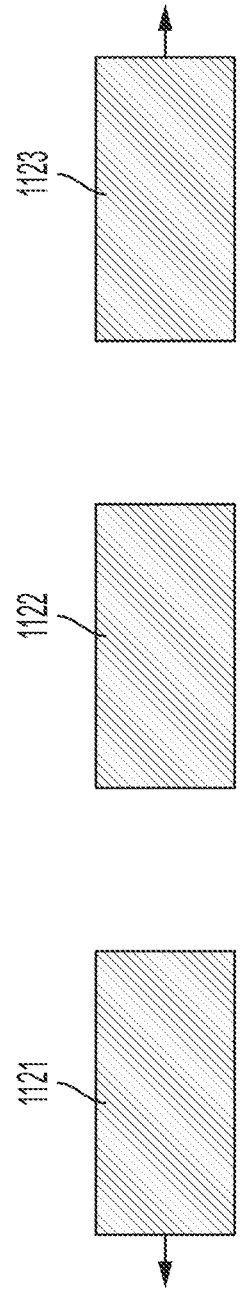

PHOTONICS PACKAGING METHOD AND DEVICE

CROSS-REFERENCE TO RELATED APPLICATIONS

This application claims priority under 35 U.S.C. § 119(e) to U.S. Provisional Patent Application Ser. No. 62/745,533, entitled "PHOTONICS PACKAGING METHOD AND DEVICE," filed on Oct. 15, 2018, which is hereby incorporated herein by reference in its entirety.

This application claims priority under 35 U.S.C. § 119(e) to U.S. Provisional Patent Application Ser. No. 62/792,720, entitled "HIGH-EFFICIENCY DOUBLE-SLOT WAVEGUIDE NANO-OPTO-ELECTROMECHANICAL PHASE MODULATOR," filed on Jan. 15, 2019, which is hereby incorporated herein by reference in its entirety.

BACKGROUND

Photonic integrated circuits can be co-packaged with electronic integrated circuits. The electronics can include digital circuitry for controlling the operations of the photonics. In some implementations, photonic integrated circuits and electronic integrated circuits are connected together via bond wires.

SUMMARY OF THE DISCLOSURE

Some embodiments relate to a photonic package comprising a photonic chip having a surface, a first recess formed on the surface, and a photonic microelectromechanical system (MEMS) device positioned at least partially in the first recess; a substrate mounted on the surface of the photonic chip; and a material layer disposed between the substrate and the photonic chip, the material layer having a second recess, the second recess being aligned with the first recess.

In some embodiments, the first recess and the second recess collectively form a cavity, wherein the cavity is larger than each of the first and second recesses.

In some embodiments, the photonic MEMS device comprises a suspended optical waveguide.

In some embodiments, the photonic MEMS device comprises a photonic phase modulator.

In some embodiments, the photonic phase modulator comprises an input optical waveguide; an output optical waveguide; and a suspended optical structure optically coupling the input optical waveguide to the output optical waveguide.

In some embodiments, the suspended optical structure comprises first, second and third optical waveguides; and a first slot formed between the first and second optical waveguides and a second slot formed between the second and third optical waveguides.

In some embodiments, the material layer comprises a non-conductive material.

In some embodiments, the photonic package further comprises a plurality of conductive pillars electrically coupling the substrate to the photonic chip.

In some embodiments, the plurality of conductive pillars pass through the material layer.

In some embodiments, the substrate comprises a silicon interposer.

In some embodiments, the photonic package further comprises an application specific integrated circuit (ASIC) mounted on the silicon interposer such that the silicon interposer is between the photonic chip and the ASIC.

In some embodiments, the substrate comprises an ASIC.

In some embodiments, the surface is a first surface and the photonic chip comprises a second surface opposite the first surface, the second surface being mounted to a circuit board.

In some embodiments, a first portion of the substrate lies over the photonic chip and a second portion of the substrate lies over the circuit board.

In some embodiments, the second surface of the photonic chip is positioned in a depression of the circuit board, the depression being formed on a top surface of the circuit board.

In some embodiments, the top surface of the circuit board and the first surface of the photonic chip are substantially co-planar.

In some embodiments, the photonic chip is edge-coupled to an optical fiber.

Some embodiments relate to a photonic package comprising a photonic chip having a plurality of photonic microelectromechanical system (MEMS) modulators, and an application specific integrated circuit (ASIC) disposed on the photonic chip, the ASIC being in electrical communication with the plurality of photonic MEMS modulators.

In some embodiments, the photonic package further comprises a silicon interposer disposed between the photonic chip and the ASIC.

In some embodiments, the photonic package further comprises a non-conductive film disposed between the photonic chip and the ASIC, the non-conductive film being patterned with a plurality of recesses, wherein the plurality of recesses are aligned with respective photonic MEMS modulators of the photonic chip.

In some embodiments, the photonic package further comprises a plurality of conductive pillars electrically connecting the ASIC with the plurality of photonic MEMS modulators, wherein the plurality of conductive pillars pass through the non-conductive film.

In some embodiments, at least one of the plurality of photonic MEMS modulators comprises a photonic phase modulator.

In some embodiments, at least one of the plurality of photonic MEMS modulators comprises a suspended optical waveguide.

In some embodiments, the photonic chip is positioned in a depression formed on a circuit board.

Some embodiments relate to a method for fabricating a photonic package, the method comprising obtaining a photonic chip having a plurality of photonic microelectromechanical system (MEMS) devices; patterning a non-conductive film to form a plurality of recesses; applying the patterned non-conductive film to a substrate; and mounting the substrate to the photonic chip such that the plurality of recesses are aligned with respective ones of the plurality of photonic MEMS devices.

In some embodiments, the substrate comprises a silicon interposer, and wherein the method further comprises mounting an application specific integrated circuit (ASIC) to the silicon interposer.

In some embodiments, the substrate comprises an ASIC.

In some embodiments, the method further comprises placing the photonic chip in a depression formed on a circuit board.

In some embodiments, the method further comprises edge-coupling an optical fiber to the photonic chip.

In some embodiments, the method further comprises transferring the substrate to a dicing tape prior to applying the patterned non-conductive film to the substrate.

In some embodiments, the method further comprises curing the patterned non-conductive film after the substrate has been mounted to the photonic chip.

In some embodiments, mounting the substrate to the photonic chip comprises performing a thermo-compression bond.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 4A is a side view of a photonic chip including a fiber groove, in accordance with some embodiments of the technology described herein.

FIG. 4B illustrates a fabrication step in which a photonic chip is mounted to a circuit board, in accordance with some embodiments of the technology described herein.

FIG. 6B illustrates a fabrication step in which a patterned material layer is applied to an interposer wafer, in accordance with some embodiments of the technology described herein.

FIGS. 13A-13C are cross-sectional views illustrating how a suspended multi-slot optical structure can be mechanically driven to vary the widths of the slots between the waveguides, in accordance with some embodiments of the technology described herein.

DETAILED DESCRIPTION

I. Overview

Figure 1A:
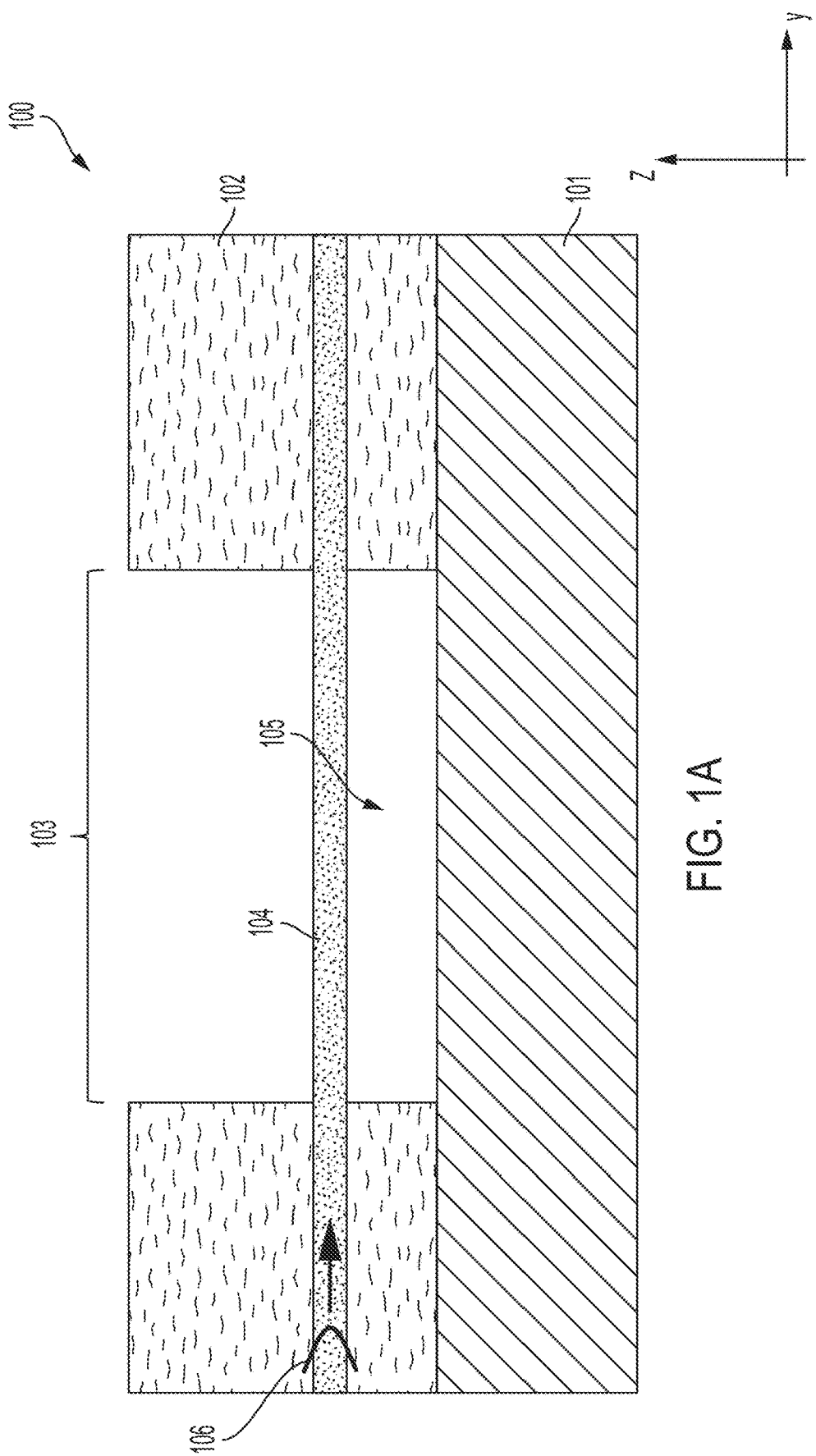
FIG. 1A is a cross sectional view of a photonic chip including a photonic microelectromechanical system (MEMS) device, in accordance with some embodiments of the technology described herein.

The inventors have recognized and appreciated that conventional packaging techniques for photonic integrated circuits are unsuitable for use with photonic microelectromechanical system (MEMS) devices. More specifically, the inventors have recognized a number of drawbacks arising when photonic MEMS devices are packaged using conventional techniques.

On one hand, photonic MEMS devices that are packaged using wire bonding techniques suffer from poor power performance. This is because wire bonding involves long bond wires, leading to large values of inductance. The large inductance, in turn, leads to signal attenuation, meaning that more power needs to be fed into an end of a bond wire in order to receive, at the other end of the bond wire, a signal with sufficient power. Additionally, the large inductance gives rise to noise.

On the other hand, conventional three-dimensional (3D) packaging techniques are ill-suited for use with photonic MEMS devices because these devices require recesses in which they can freely move when stimulated with a drive force, but these packaging techniques often result in underfill leaking into the recesses. The leaked material can inadvertently fill the recesses, thus gluing the photonic MEMS devices to the substrate. Furthermore, certain photonic MEMS devices are formed on the surface of the die. The result is that use of resist dams—which are used in some context to prevent block leakage—would lead to a substantial increase in the size of the die, making it impractical to use.

Recognizing these limitations, the inventors have developed packages for use with photonic MEMS devices that are low-power and low-noise, and that are designed to preserve the integrity of the photonic MEMS devices. Some embodiments are directed to photonic packages in which an application specific integrated circuit (ASIC) is stacked on top of a photonic chip, and in which a material layer is interposed between the ASIC and the photonic chip. The material layer includes recesses that are patterned such that, when the package is assembled, the recesses align with the photonic MEMS devices. In this way, enclosed cavities are formed that protect the photonic MEMS devices from intrusion of extraneous materials, which may otherwise glue the photonic MEMS devices to the substrate.

II. Photonic MEMS Devices

Photonic MEMS devices of the types described herein include photonic devices having portions that can move relative to the substrate on which they are formed when stimulated with a driving force. In some such embodiments, a portion of a waveguide may be suspended above the underlying substrate. The suspended region of the waveguide may form a cantilever, a bridge, or any other suitable shape. In the region in which it is suspended, the waveguide may be free to move independently of the substrate.

Photonic MEMS devices may be used in a variety of applications, including for example in photonic modulators (e.g., phase modulators and amplitude modulators), variable attenuators, photodetectors, photonic switches, photonic multiplexers and demultiplexer, photonic circulators, micromirrors, etc. In at least some of these devices, actuation of the device may involve driving a waveguide to move it relative to the substrate. Any suitable type of driver may be used for this purpose, including a mechanical driver, an electrical driver or an acoustic driver, among others. Motion of the waveguide may alter one or more optical characteristics of the optical field supported by the waveguide. This, in turn, can lead to a variation of a certain optical effect, such as a variation in the plasma dispersion effect, free-carrier absorption, quantum-confined Stark effect, Pockels effect, optical phase matching, Raman amplification, thermo-optic effect, acousto-optic effect, electro-optic effect, dichroism, birefringence, Kerr effect, self-phase modulation, cross-phase modulation, four wave mixing, second harmonic generation, third harmonic generation, or other linear or non-linear effects.

Figure 1B:
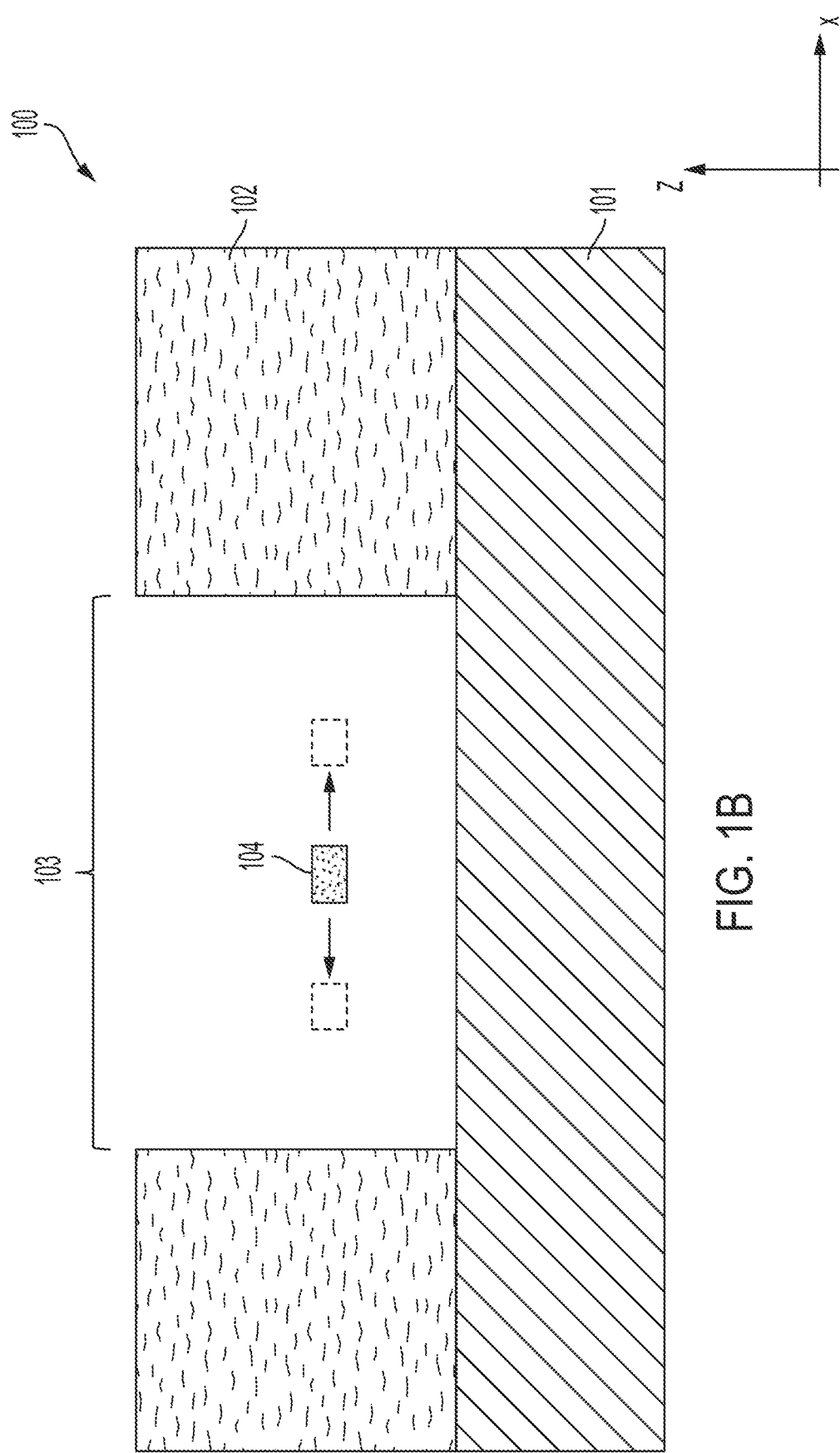
FIG. 1B is another cross sectional view of the photonic chip of FIG. 1A, in accordance with some embodiments of the technology described herein.

An example of a photonic MEMS device is illustrated in FIGS. 1A-1B, in accordance with some embodiments. FIG. 1A is a cross view of a photonic chip 100 in a plane parallel to the yz-plane, and FIG. 1B is a cross view of photonic chip 100 in a plane parallel to the xz-plane. Photonic chip 100 includes a substrate handle 101, a cladding 102, a recess 103, and a waveguide 104. Substrate handle 101 can be made of, or otherwise include, a semiconductor material, such as silicon, indium phosphide, gallium arsenide, etc. Waveguide 104 can be made of, or otherwise include, a material having a refractive index greater that the refractive index of cladding 102, thereby producing total internal reflection. In one example, waveguide 104 is made of silicon and cladding 102 is made of silicon oxide. In another example, waveguide 104 is made of silicon nitride and cladding 102 is made of silicon oxide. In yet another example, waveguide 104 is made of silicon and cladding 102 is made of silicon nitride. In yet another example, both waveguide 104 and cladding 102 are made of a certain III-V semiconductor alloy, but the respective alloy compositions are engineered such that the refractive index of waveguide 104 is greater than that of cladding 102. Other combinations are also possible.

A recess 103 is formed through a portion of cladding 102. The recess may be formed by removing a portion of cladding 102, for example via etching. In some embodiments, recess 103 is formed via reactive-ion etching, though other types of etching techniques are also possible. In the example of FIG. 1A, recess 103 reaches the top surface of substrate handle 101. As a result, the top surface of substrate handle 101 is exposed to air. In other embodiments, however, the recess may be shallower, such that a residual layer of cladding 102 covers the top surface of substrate handle 101.

Due to the presence of recess 103, a portion of waveguide 104 is suspended in air. Undercut 105 separates waveguide 104 from the top surface of substrate handle 101 along the z-axis direction. Both ends of waveguide 104 are embedded in cladding 102, thereby forming a bridge waveguide. In other embodiments, however, one end of a waveguide is embedded in a cladding and the other end of the waveguide is suspended, thereby forming a cantilever. In the example of FIG. 1A, an optical mode 106 propagates in waveguide 104 from left to right, passing though the suspended region.

FIG. 1B illustrates a cross section of waveguide 104 in the suspended region in a plane parallel to the xz-plane. As shown in this figure, waveguide 104 is surrounded by air (though in some embodiments, air may be removed from recess 103 to form a vacuum). Two arrows are shown at either sides of waveguide 104 to indicate that, in the suspended region, waveguide 104 is free to translate independently of substrate handle 101. The dashed blocks illustrate the mechanical mode of waveguide 104 (i.e., they indicate the position of waveguide 104 at either ends of the motion range). It should be appreciated that not all photonic MEMS devices are limited to motion in the xy-plane as shown in FIG. 1B, as other mechanical modes are also possible.

Photonic chip 100 may include a driver (not shown in FIGS. 1A-1B) for causing motion of waveguide 104. The photonic chip may further include circuitry for controlling the operations of the driver. Alternatively, the drive circuitry may be disposed on a separate substrate, such as an application-specific integrated circuit (ASIC). Motion of waveguide 104 may lead to a variety of optical effects. One such effect is described in detail in connection with FIGS. 10-15, illustrating a photonic MEMS phase modulator, in accordance with some embodiments.

III. Photonic Packages

Some embodiments relate to packages for photonic chips that include one or more photonic MEMS devices. Some such packages may form enclosed cavities arranged to protect the regions in which the photonic MEMS devices are formed. In some embodiments, the package may be arranged so that a substrate (e.g., an interposer or an ASIC) is placed on top of the photonic chip.

Figure 2A:
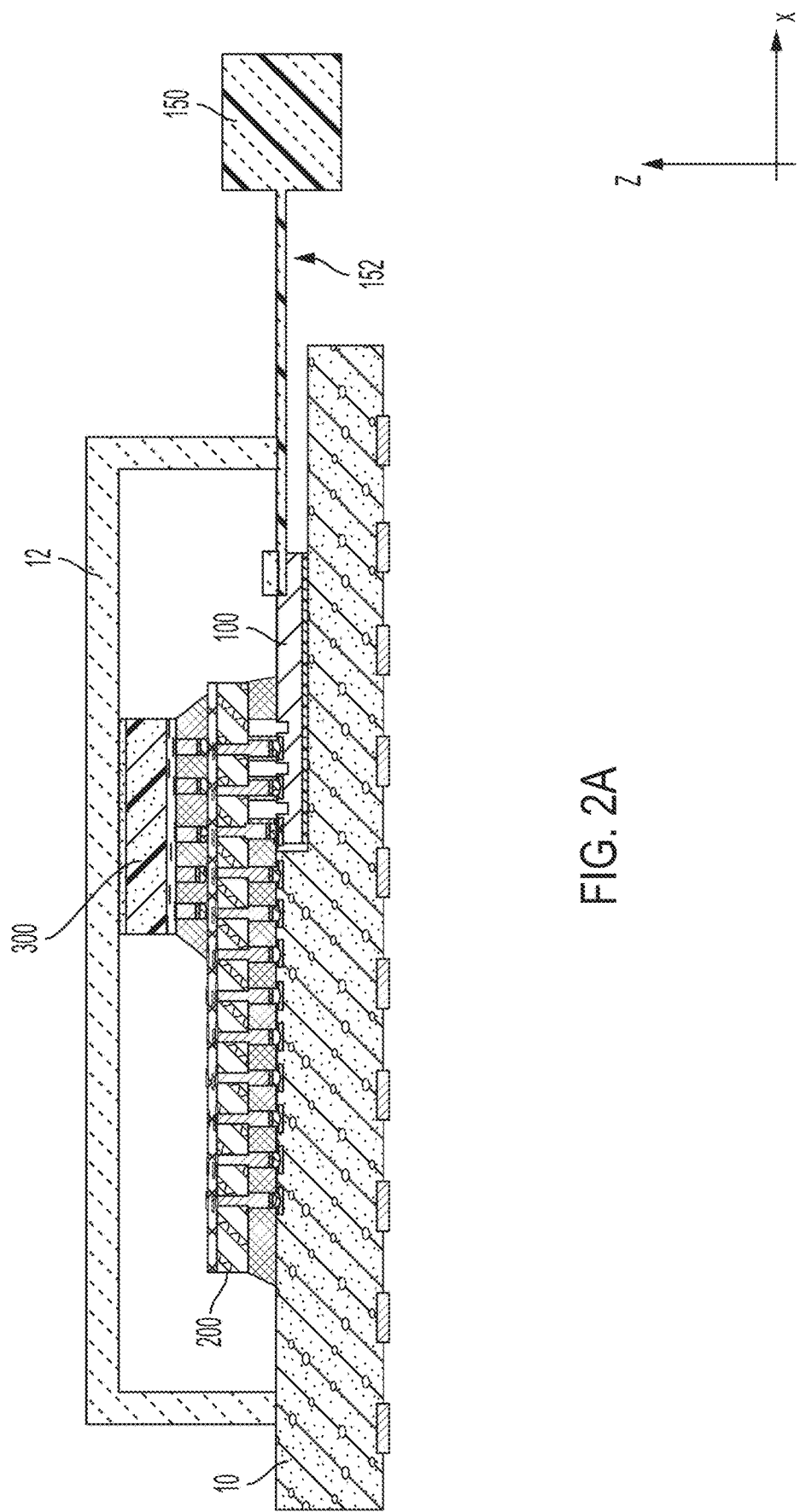
FIG. 2A is a cross sectional view of a photonic package including the photonic chip of FIG. 1A, in accordance with some embodiments of the technology described herein.

One such package is illustrated in FIGS. 2A-2D, in accordance with some embodiments. FIG. 2A illustrates a package including a circuit board 10, a photonic chip 100, an interposer 200 and an ASIC 300. Photonic chip 100 includes one or more photonic MEMS devices of the types described in connection with FIGS. 1A-1B (more specific examples are described below in connection with FIGS. 10-15). ASIC 300 includes circuitry for controlling the operations of photonic chip 100, including for example circuitry for controlling drivers for the photonic MEMS devices. ASIC 300 may be implemented using any suitable type of digital controller, including a processor or a field programmable gate array (FPGA).

A light source 150 may be disposed outside the package and may provide light for enabling the operations of photonic chip 100. Light source 150 may include, among other types of sources, a laser (e.g., diode laser or a vertical-cavity surface emitting lasers) or a light-emitting diode (LED). Light source 150 may emit in the visible, infrared (including near infrared, mid infrared and far infrared) or ultraviolet portion of the electromagnetic spectrum. In some embodiments, the emission wavelength is in the O-band, C-band or L-band. Light generated by source 150 may be coupled to photonic chip 100 via optical fiber 152.

A lid 12 may be used to enclose (or at least partially cover) the package. Lid 12 may be made of a thermally conductive material to enable heat dissipation. An opening through lid 12 may be provided to allow passage of optical fiber 152.

In the example of FIG. 2A, an interposer 200 is disposed between photonic chip 100 and FPGA 300. In other embodiments (including in the example of FIG. 3A, which is discussed in detail further below), ASIC 300 may be disposed directly on top of photonic chip 100. Interposer 200 may be used as a fan-out adapter if the input/output terminals of photonic chip 100 are arranged differently from the way in which the input/output terminals of ASIC 300 are arranged (e.g., if they have different pitches). The top surface of interposer 200 may have input/output terminals adapted to interface with ASIC 300 and the lower surface of interposer 200 may have input/output terminals adapted to interface with photonic chip 100. Interposer 200 includes conductive interconnects (e.g., vias and/or conductive traces) for routing signals between photonic chip 100 and ASIC 300. Interposer 200 may be a silicon interposer, though other types of interposers may be used.

Figure 2B:
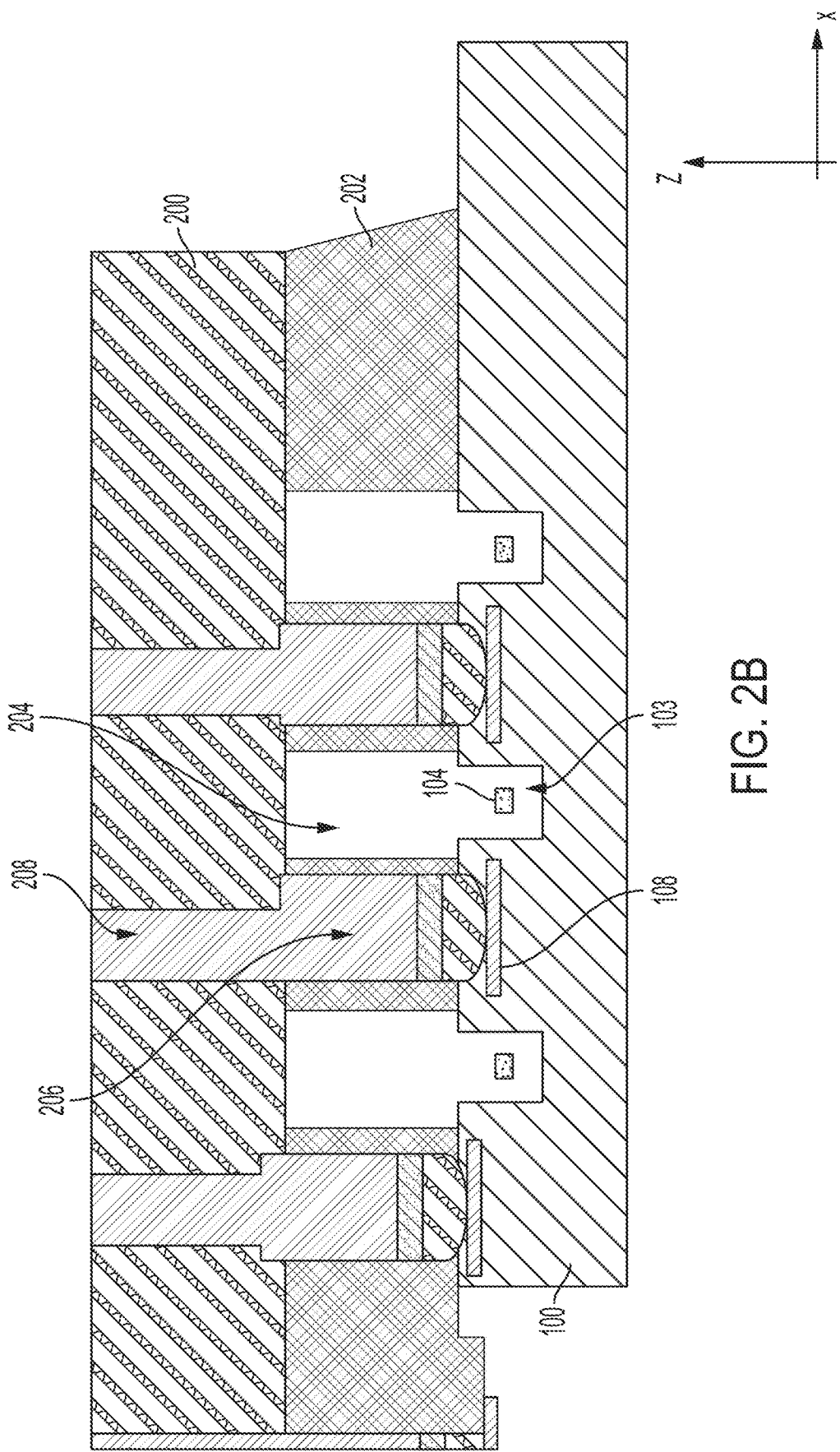
FIG. 2B illustrates a portion of the photonic package of FIG. 2A in additional detail, in accordance with some embodiments of the technology described herein.

FIG. 2B illustrates a portion of the photonic package of FIG. 2A in additional detail. In particular, FIG. 2B illustrates the region in which interposer 200 interfaces with photonic chip 100. It should be noted that the other components of the package of FIG. 2A have been omitted from FIG. 2B for the sake of clarity. As shown in FIG. 2B, a material layer 202 is sandwiched between interposer 200 and photonic chip 100. As a result, photonic chip 100, material layer 202 and ASIC 200 form a stack in the z-axis direction. In some embodiments, material layer 202 is non-conductive. Material layer 202 may be made of any suitable non-conductive material, including for example a polymer, a dielectric, a glass, or an oxide, among other possibilities. In some such embodiments, material layer 202 may form a non-conductive film (NCF).

Recesses 204 are formed through material layer 202. Recesses 204 are aligned—with respect to the x-axis and y-axis directions—with recesses 103 of photonic chip 100 (where waveguides 104 and/or other photonic MEMS devices are positioned). Being aligned to one another, each pair of recesses 204 and 103 forms an enclosed cavity. One or more photonic MEMS devices are positioned inside an enclosed cavity. The lateral extension (e.g., in the x-axis and y-axis directions) of recesses 204 and 103 may be the same or may be different. Either way, when a recess 204 is aligned with a recess 103, there is at least one region in which the recesses are in communication with one another.

The cavities may be filled with air or may be in a vacuum. Thus, the presence of these cavities ensures that the photonic MEMS devices that lie inside them are suspended in air (or in a vacuum), thereby allowing free motion of these devices relative to the photonic chip's substrate handle. Furthermore, the presence of such cavities prevents flow of material into a recess 103, which may otherwise glue the photonic MEMS devices to the photonic chip's substrate handle.

In the example of FIG. 2B, recesses 204 extend from the bottom surface of material layer 202 to the top surface of material layer 202. In other embodiments, the recesses are shallower, and extend from the bottom surface of material layer 202 to a plane defined inside material layer 202. A cavity may be bounded, at the lower end, by photonic chip 100, and at the upper end, by interposer 200 or a residual portion of material layer 202.

Conductive pillars 206 pass through material layer 202 and extend along the z-axis direction. The conductive pillars 206 may be made of or otherwise include copper, though other conductive materials can be used. In some embodiments, conductive pillars 206 include micro bumps. The lower end of conductive pillars 206 may contact respective pads 108, formed on photonic chip 100. The upper end of conductive pillars 206 may contact respective vias 208 formed through interposer 200. Thus, conductive pillars 206 enable transfer of signals between photonic chip 100 and interposer 200.

Figure 2C:
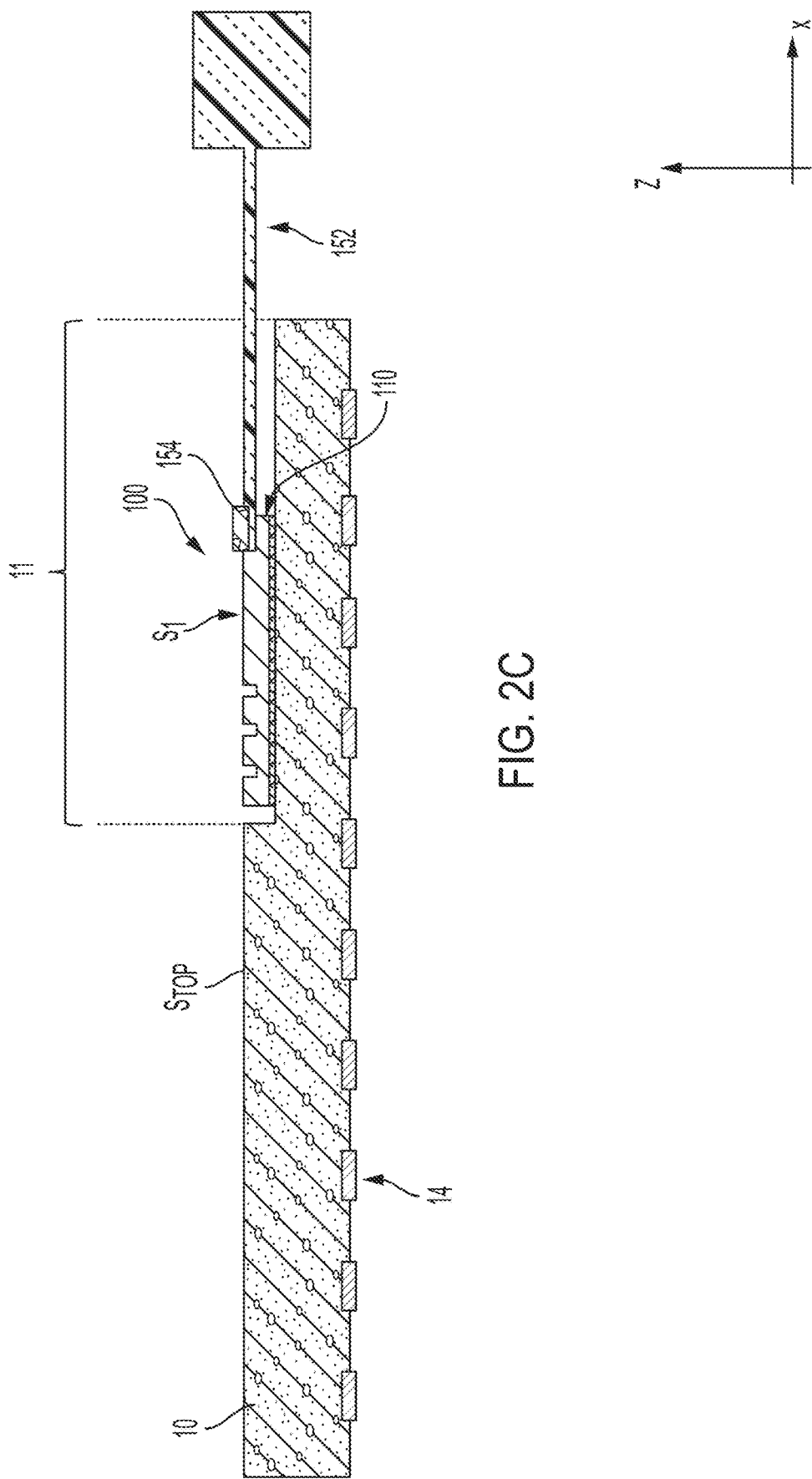
FIG. 2C illustrates another portion of the photonic package of FIG. 2A in additional detail, in accordance with some embodiments of the technology described herein.

FIG. 2C illustrates another portion of the photonic package of FIG. 2A in additional detail. In particular, FIG. 2C illustrates the region in which photonic chip 100 interfaces with circuit board 10. It should be noted that the other components of the package of FIG. 2A have been omitted from FIG. 2C for the sake of clarity. Circuit board 10 includes conductive traces for routing signals and, optionally, electronic circuitry for processing the signals. Circuit board 10 may be made of a rigid material or a flexible material. In some embodiments, circuit board 10 is made of a laminate of one or more materials. The lower surface of the circuit board 10 includes pads 14 for interfacing the circuit board to an underlying substrate (e.g., a motherboard).

In some embodiments, a depression 11 may be formed on the top surface ($S_{TOP}$) of circuit board 10, and photonic chip 100 may be positioned in the depression 11. The depth of depression 11 may be selected such that, when photonic chip 100 is positioned in the depression, the top surface ($S_{TOP}$) of circuit board 10 and the top surface ($S_1$) of photonic chip 100 lie substantially in the same plane (e.g., such the plane of $S_1$ and the plane of $S_{TOP}$ diverge by less than 1 degree and/or are offset by less than 1 μm). Having the top surface ($S_{TOP}$) of circuit board 10 substantially planar with the top surface ($S_1$) of photonic chip 100 results in an even interface. Having an even interface, in turn, is important to provide mechanically stability when a portion of interposer 200 lies over photonic chip 100 and a portion of interposer lies over circuit board 10, as in the embodiment of FIG. 2A.

In some embodiments, an adhesive 110 is used to attach photonic chip 100 to circuit board 10.

A fiber assembly 154 may be used to connect fiber 152 to photonic chip 100. In this example, optical fiber 152 couples to a side edge of photonic chip (in other words, optical fiber 152 is edge-coupled to photonic chip 100). However, other coupling arrangements are possible. In one of such arrangements, an optical fiber may couple to top surface $S_1$ of photonic chip 100 (in other words, optical fiber 152 is surface-coupled to photonic chip 100). In some such embodiments, optical gratings or prisms may be formed on top surface $S_1$ to facilitate coupling with the optical fiber.

Figure 2D:
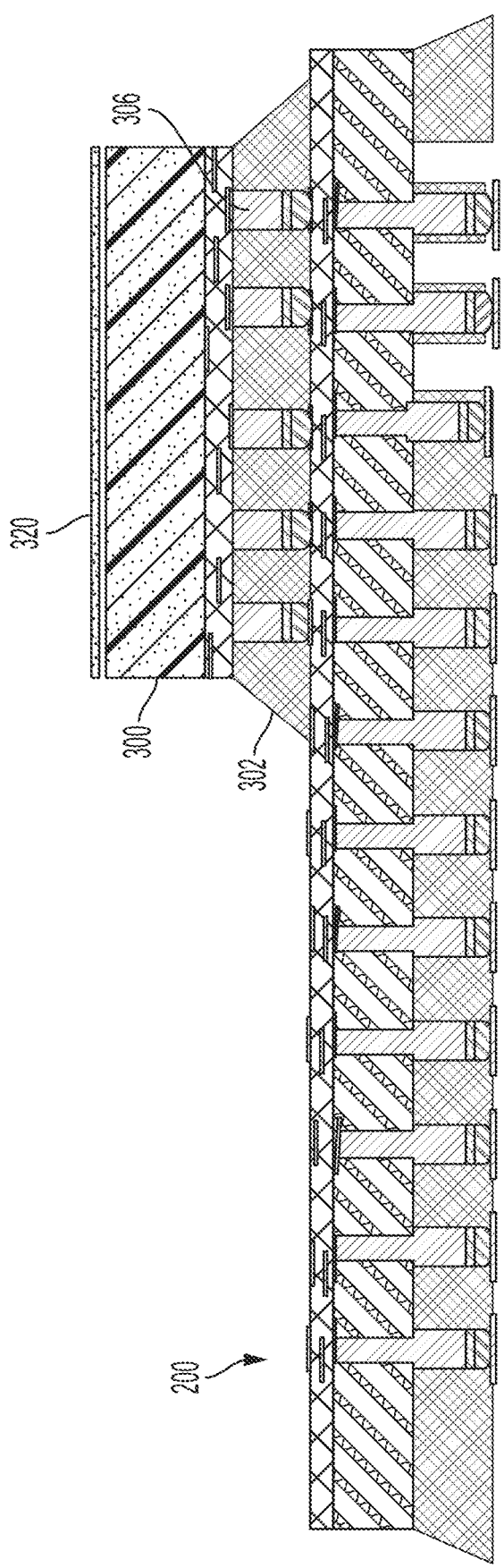
FIG. 2D illustrates yet another portion of the photonic package of FIG. 2A in additional detail, in accordance with some embodiments of the technology described herein.

FIG. 2D illustrates yet another portion of the photonic package of FIG. 2A in additional detail. In particular, FIG. 2D illustrates the region in which interposer 200 interfaces with ASIC 300. It should be noted that the other components of the package of FIG. 2A have been omitted from FIG. 2D for the sake of clarity. As shown in FIG. 2D, a material layer 302 is sandwiched between ASIC 300 and interposer 200. Material layer 302 may be non-conductive in some embodiments. For example, material layer 302 may include a non-conductive paste.

Conductive pillars 306 pass through material layer 302 and extend along the z-axis direction. The conductive pillars 306 may be made of or otherwise include copper, though other conductive materials can be used, or may include micro bumps. The lower end of conductive pillars 306 may contact respective pads formed on the top surface of interposer 200. The upper end of conductive pillars 306 may contact respective vias formed through ASIC 300. Thus, conductive pillars 306 enable transfer of signals between ASIC 300 and interposer 200.

In some embodiments, a thermal interface material (TIM) 320 is placed on the top surface of ASIC 300. The TIM 320 may contact lid 12, thereby facilitating transfer of heat from ASIC 300 to lid 12.

Figure 3A:
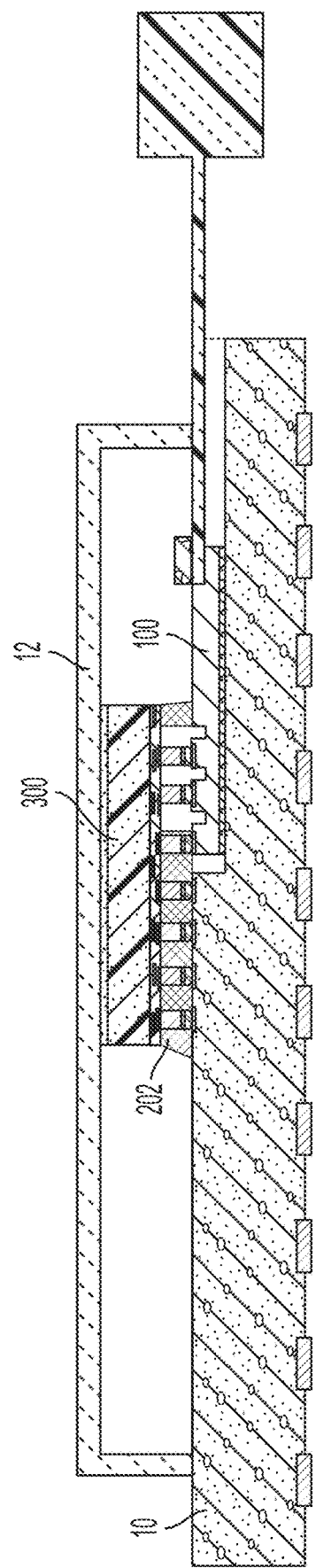
FIG. 3A is a cross sectional view of another photonic package including the photonic chip of FIG. 1A, in accordance with some embodiments of the technology described herein.
Figure 3B:
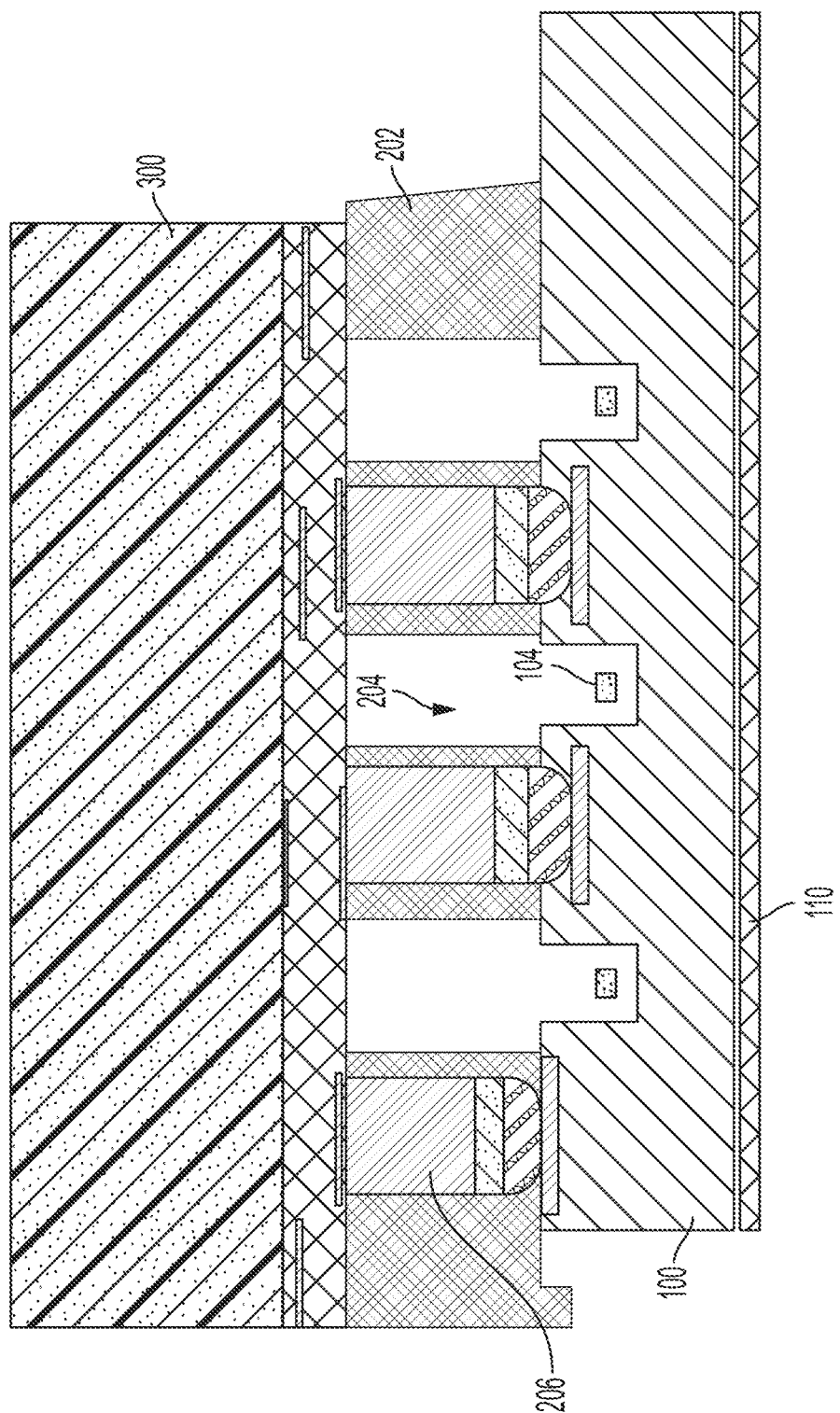
FIG. 3B illustrates a portion of the photonic package of FIG. 3A in additional detail, in accordance with some embodiments of the technology described herein.

The packages described above include an interposer disposed between ASIC 300 and photonic chip 100. In other embodiments, ASIC 300 may interface directly with photonic chip 100. One such embodiment is illustrated in FIGS. 3A-3B. Similar to the package of FIGS. 2A-2D, the package of FIGS. 3A-3B includes a circuit board 10, a photonic chip 100, an ASIC 300, and a lid 12. Unlike the packages of FIG. 2A-2D, the package of FIG. 3A-3B lacks interposer 200. The advantage of lacking an interposer is a significant reduction in packaging costs, as fewer packaging steps may be needed. The lack of an interposer, however, has some drawbacks. For example, it may lead to an increase in the complexity of ASIC 300 for handling the signals to and from photonic chip 100.

Similar to the package of FIGS. 2A-2D, photonic chip 100 may be placed in a depression formed on circuit board 10. The top surface of circuit board 10 may be co-planar with the top surface of photonic chip 100, thereby providing an even interface for ASIC 300.

FIG. 3B illustrates a portion of the photonic package of FIG. 3A in additional detail. In particular, FIG. 3B illustrates the region in which photonic chip 100 interfaces with ASIC 300. It should be noted that the other components of the package of FIG. 3A have been omitted from FIG. 3B for the sake of clarity. A material layer 202 may be sandwiched between ASIC 300 and photonic chip 100. As described above in connection with FIG. 2B, recesses 204 are formed through material layer 202. Recesses 204 are aligned with recesses 103 of photonic chip 100. Being aligned to one another, each pair of recesses 204 and 103 forms an enclosed cavity. The presence of these cavities ensures that the photonic MEMS devices that lie inside them are suspended in air (or in a vacuum), thereby allowing free motion of these devices relative to the photonic chip's substrate handle. Recesses 204 may extend from the bottom surface of material layer 202 to the top surface of material layer 202, as illustrated in FIG. 3B, or may be shallower.

Conductive pillars 206 pass through material layer 202 and extend along the z-axis direction. Conductive pillars 206 enable transfer of signals between photonic chip 100 and ASIC 300.

It should be appreciated that photonics packages of the types described herein may be used with optical devices other than photonic MEMS devices. For example, photonic packages of the types described herein may be used in connection with un-cladded photonic chips. Such photonic chips may be used, among other applications, for gas sensing.

IV. Fabrication of Photonic Packages

Photonic packages of the types described herein may be fabricated, at least in some embodiments, using flip-chip techniques. FIGS. 4A-4B, 5A-5B, 6A-6C, 7, 8A-8B and 9 illustrate a process flow for fabricating a package of the types illustrated in FIGS. 2A-2D, in accordance with some embodiments. It should be appreciated that the order in which the steps are presented in these figures in just an example, as the order may be changed in some embodiments.

Initially, a photonic chip 100 is provided. The photonic chip 100 may include one or more photonic MEMS devices, as described in connection of FIGS. 1A-1B. In the process step of FIG. 4A, photonic chip 100 is etched to form a fiber groove 120. Groove 120 may be formed at an edge of photonic chip 100 through substrate handle 101. Groove 120 may be shaped and sized to accommodate the end of an optical fiber, thereby enabling edge-coupling. Groove 120 may have any suitable shape, including for example a v-shape or a u-shape, or a combination thereof. In some embodiments, groove 120 may be formed by etching substrate handle 101 along its crystallographic direction. The etch process may be anisotropic in some embodiments.

In the process step of FIG. 4B, a circuit board 10 is provided. The circuit board may be etched to form a depression 11. The etching may be performed via laser etching in some embodiments. The depth of the etch may be selected to that, when photonic chip 100 is disposed therein, the top surfaces of circuit board 10 and photonic chip 100 are substantially co-planar. Subsequently, photonic chip 100 is disposed in the depression 11. In some embodiments, as illustrated in FIG. 4B, an adhesive 110 is disposed in the depression 11, and then photonic chip 100 is placed on top of the adhesive 110. In other embodiments, the adhesive is first attached to the photonic chip, and then the photonic chip is placed in the depression 11. Either way, an adhesive is positioned between the photonic chip and the circuit board. In other embodiments, the adhesive may be omitted. Photonic chip 100 may be disposed such that the bottom surface $S_2$ is proximate the circuit board and the top surface $S_1$ (in which recesses 103 are formed) is distal the circuit board. The end of an optical fiber (not shown in FIG. 4B) may be placed inside groove 120.

Figure 5B:
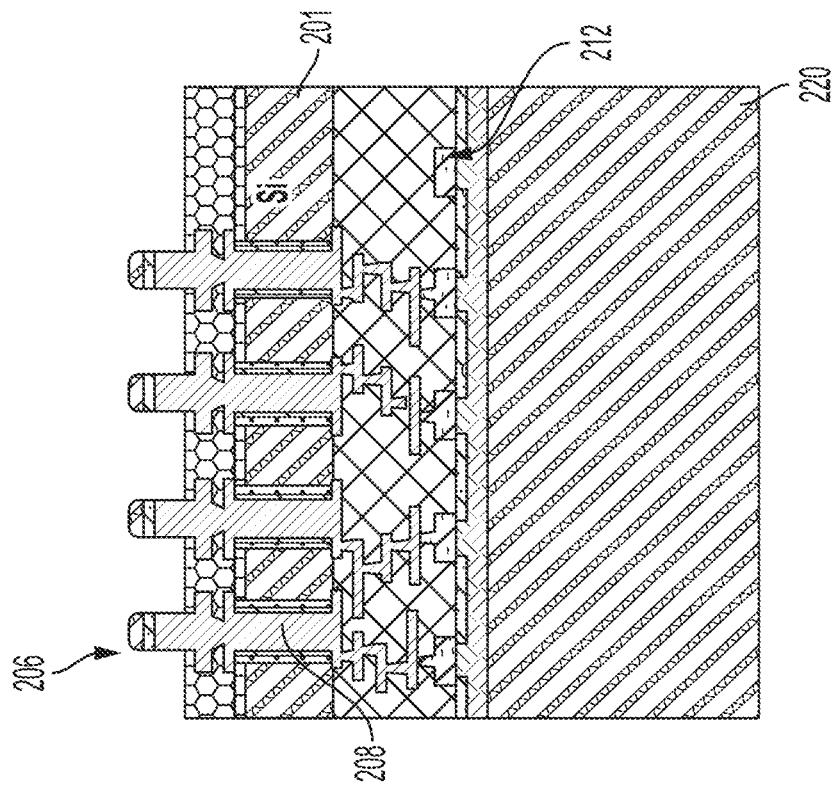
FIG. 5B is a cross sectional of the interposer of FIG. 5A once the interposer has been placed on a carrier, in accordance with some embodiments of the technology described herein.
Figure 5A:
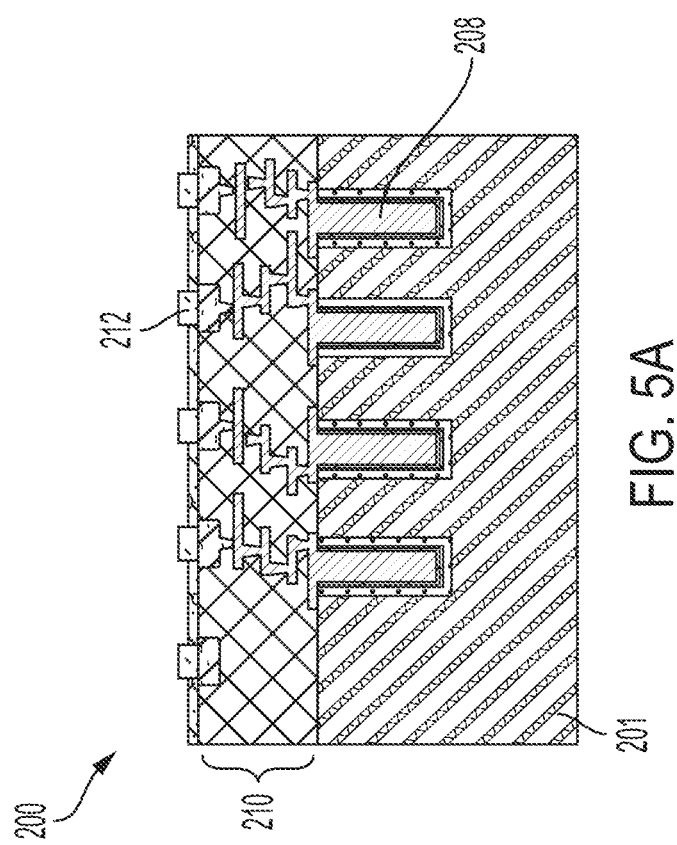
FIG. 5A is a cross sectional view of an interposer, in accordance with some embodiments of the technology described herein.

In the process step of FIG. 5A, an interposer 200 is provided. The interposer includes a substrate handle 201 (e.g., a silicon substrate handle) and an interposer device layer 210. Interposer device layer 210 may include conductive interconnects, such as vias and/or conductive traces. Pads 212 may be formed over the interposer device layer 210. Through-silicon vias 208 (TSVs) or other types of vias may be formed through a portion of the substrate handle 201.

In the process step of FIG. 5B, interposer 200 is flipped and substrate handle 201 is thinned. The substrate handle may be thinned until the ends of TSVs 208 are exposed. Additionally, interposer 200 may be disposed on a carrier 220 (e.g., a glass carrier). Additionally, conductive pillars 206 are formed to be in contact with TSVs 208. In some embodiments, the process steps of FIGS. 5A-5B are performed at the wafer level, though die-level processing may be performed in other embodiments.

Figure 6A:
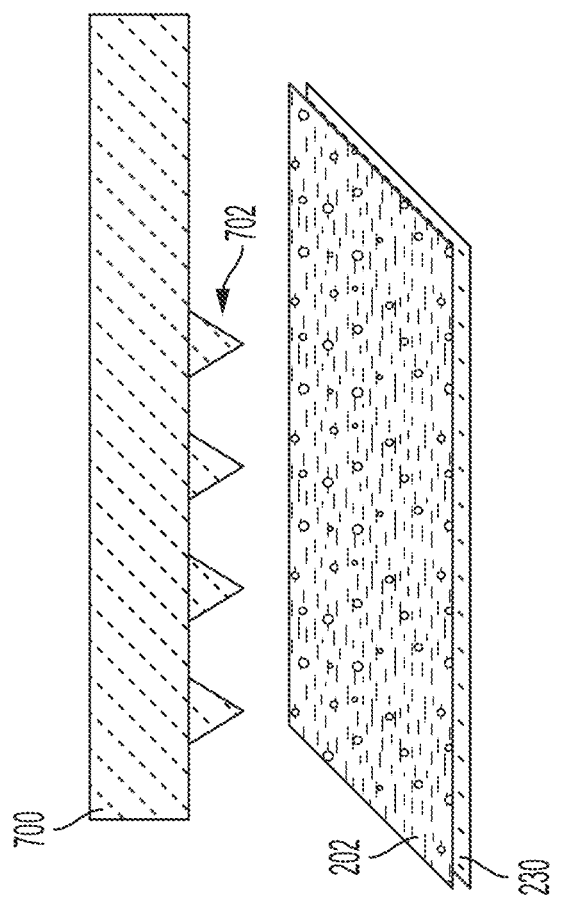
FIG. 6A illustrates a fabrication step in which a material layer is patterned with a plurality of recesses, in accordance with some embodiments of the technology described herein.

In the process step of FIG. 6A, a material layer 202 is placed on a support 230. At this stage, material layer 202 may in malleable state. Additionally, a stamp 700 having a plurality of protrusions 702 is applied on the material layer 202 to form a plurality of recesses 204 (shown in FIG. 2B).

In the process step of FIG. 6B, interposers 200 are released from carrier 220, and the interposer wafer 250 is placed on a dicing tape 260. In addition, the patterned material layer 202 is applied onto the interposer wafer 250. In addition, interposers 200 are singulated, for example using a die saw.

Figure 6C:
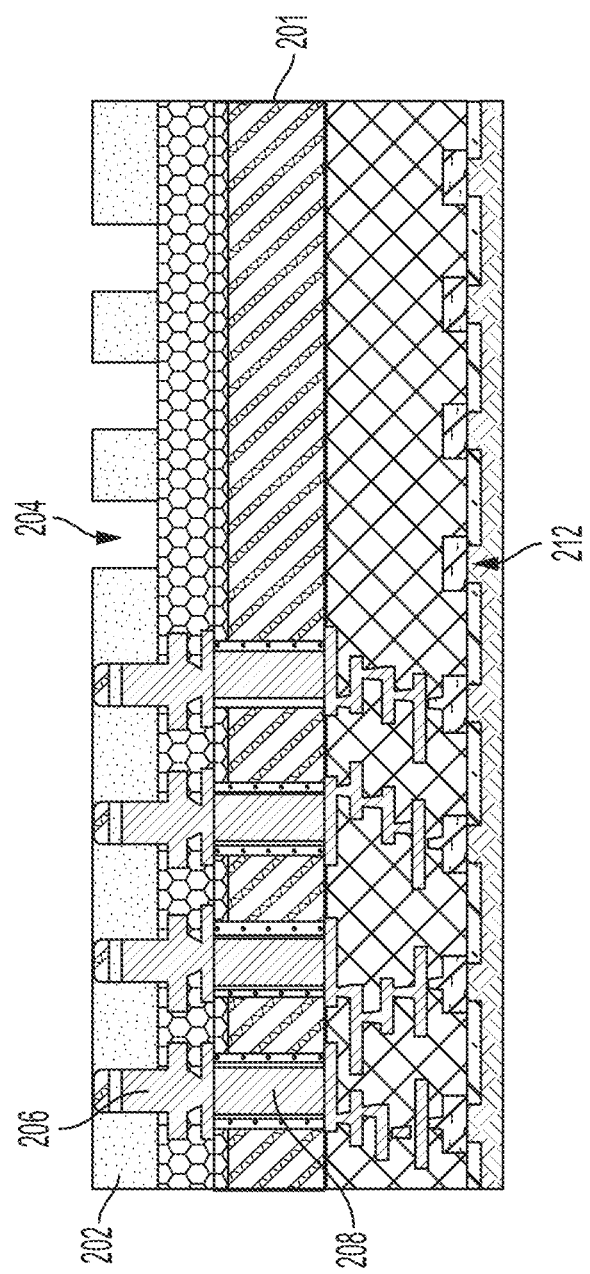
FIG. 6C is a cross sectional view of an interposer after application of a patterned material layer, in accordance with some embodiments of the technology described herein.

FIG. 6C illustrates an interposer 200 after application of a patterned material layer 202. As shown, a plurality of recesses 204 are formed through material layer 202.

Figure 7:
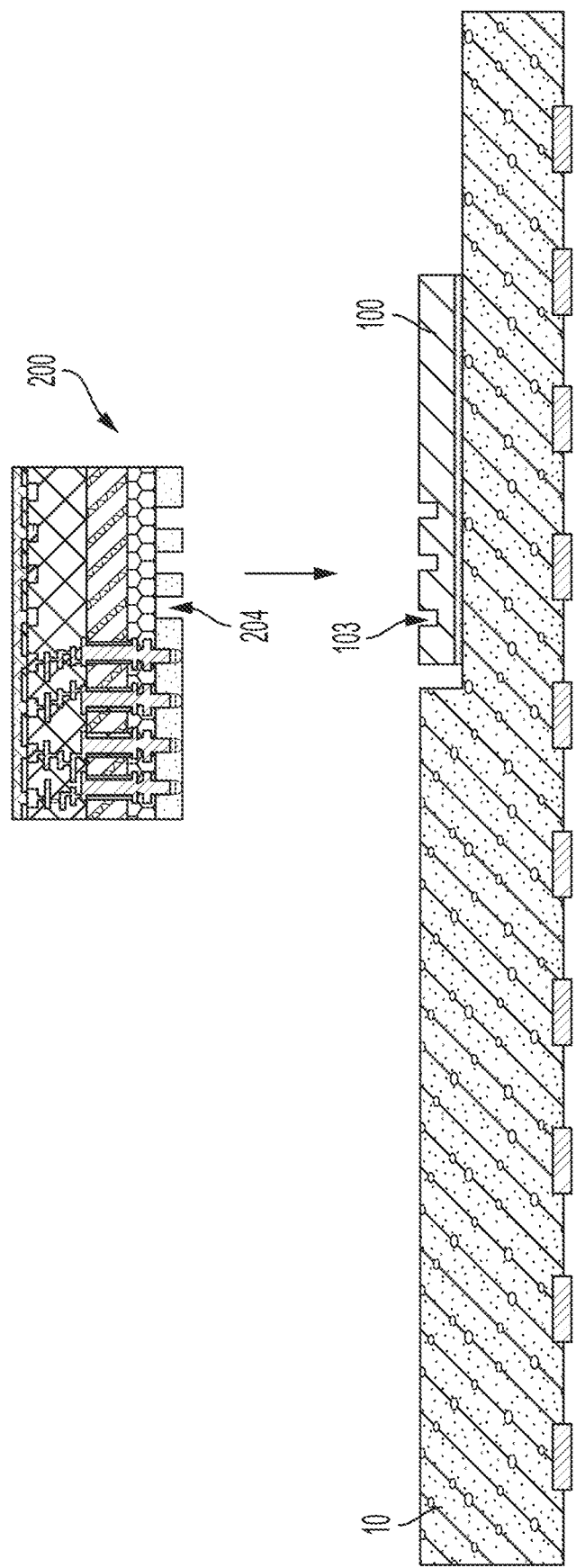
FIG. 7 illustrates a fabrication step in which an interposer is mounted on a photonic chip, in accordance with some embodiments of the technology described herein.

In the process step of FIG. 7, an interposer 200 is bonded to photonic chip 100. In some embodiments, a portion of interposer 200 lies over circuit board 10 and a portion of interposer 200 lies over photonic chip 100. In some embodiments, interposer 200 may be bonded by thermo-compression bonding, though other bonding techniques may be used. In addition, material layer 202 may be cured, thereby providing a solid interface. Once bonded, conductive pillars 206 contact respective pads of photonic chip 100 and/or respective pads of circuit board 10.

Figure 8B:
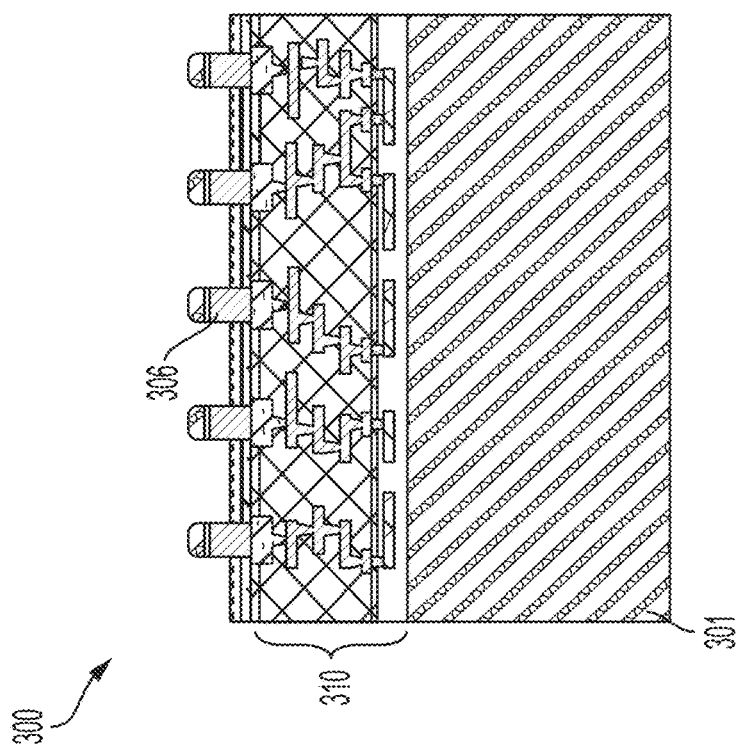
FIG. 8B is a cross sectional view of the ASIC of FIG. 8A after a plurality of conductive pillars have been formed thereon, in accordance with some embodiments of the technology described herein.
Figure 8A:
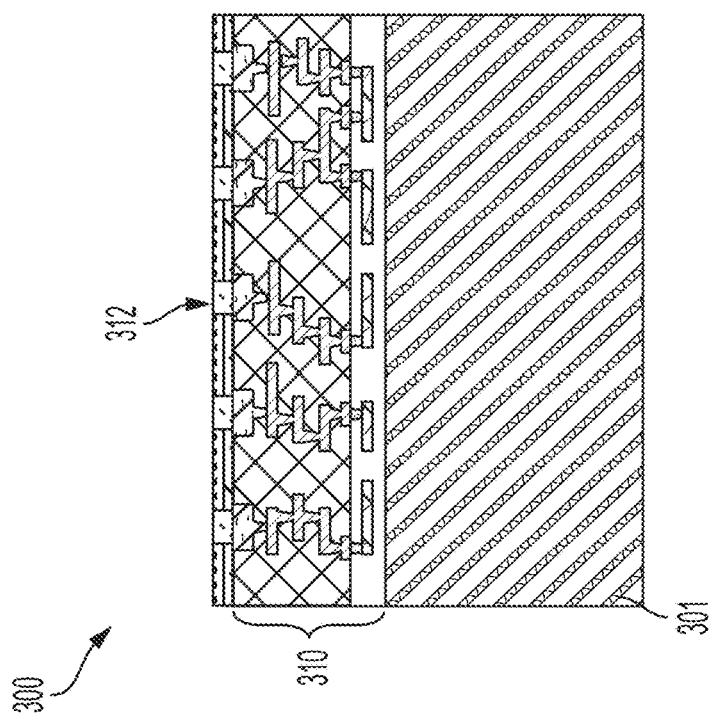
FIG. 8A is a cross sectional view of an application specific integrated circuit (ASIC), in accordance with some embodiments of the technology described herein.

In the process step of FIG. 8A, an ASIC 300 is provided. ASIC 300 includes a substrate handle 301 and ASIC device layer 310. ASIC device layer 310 includes circuits, such as circuits for controlling the operations of photonic chip 100, including circuits for controlling the operations of the photonic MEMS devices. ASIC device layer 310 further includes conductive traces for routing the signals. Pads 312 are formed over ASIC device layer 310.

In the process step of FIG. 8B, conductive pillars 306 are formed on pads 312. Conductive pillars 306 may include copper pillars, micro bumps or any other type of connectors. Though not illustrated in FIG. 8B, material layer 302 may be applied to ASIC 300 in a molten or otherwise malleable state.

Figure 9:
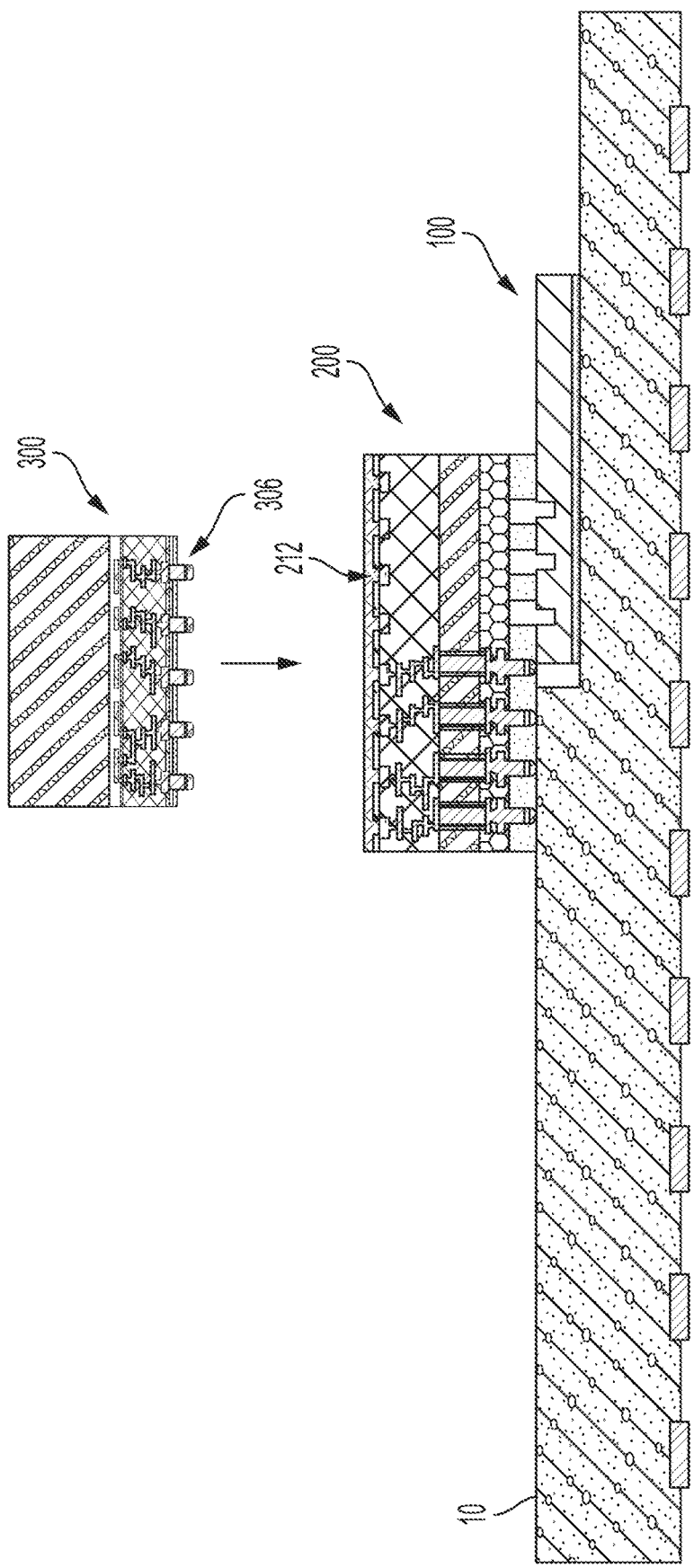
FIG. 9 illustrates a fabrication step in which an ASIC is mounted on an interposer, in accordance with some embodiments of the technology described herein.

In the process step of FIG. 9, ASIC 300 is bonded to interposer 200, for example using a thermo-compression bonding. Once bonded, conductive pillars 306 are in contact with pads 212. In addition, a thermal interface material (not shown in FIG. 9) 320 may be applied on ASIC 300, and lid 12 (not shown in FIG. 9) may be mounted, resulting in the package of FIG. 2A.

The package of FIG. 3A may be fabricated in a similar fashion. In the process step of FIG. 6B, patterned material layer 202 may be applied on the ASIC wafer, rather than on the interposer wafer. Subsequently, in the process step of FIG. 7, ASIC 300—together with material layer 202—may be disposed directly on photonic chip 100. In some embodiments, a portion of the ASIC 300 lies over circuit board 10 and a portion of ASIC 300 lies over photonic chip 100. Material layer 202 may be cured, thereby providing a solid interface between ASIC 300 and photonic chip 100.

V. Photonic Phase Modulators

Examples of photonic MEMS device that may be packaged according to the techniques described herein include Nano-Opto-Electromechanical Systems (NOEMS) phase modulators. Some embodiments relate to NOEMS phase modulators having multiple suspended optical waveguides positioned adjacent to one another and forming a plurality of slots therebetween. NOEMS phase modulators of the types described herein may be integrated in a photonic chip 100. The dimensions of the slots are sufficiently small to form slot waveguides, whereby a substantial portion (e.g., a majority) of the mode energy is confined in the slots themselves. These modes are referred to herein as slot modes. Having a substantial portion of the mode energy in the slots enables modulation of the effective index of the mode, and a result, of the phase of an optical signal embodying the mode, by causing variations in the dimensions of the slots. In some embodiments, phase modulation can be achieved by applying mechanical forces that cause variations in the dimensions of the slots.

NOEMS phase modulators of the types described herein are photonic MEMS devices that may be used in a variety of applications, including for example in telecom and datacom (including local area networks, metropolitan area networks, wide area networks, data center networks, satellite networks, etc.), analog applications such as radio-over-fiber, all-optical switching, coherent Lidar, phased arrays, coherent imaging, machine learning and other types of artificial intelligence applications. Additionally, the NOEMS modulators may be used as part of amplitude modulators, for example if combined with a Mach Zehnder modulator. For example, a Mach Zehnder modulator may be provided in which a NOEMS phase modulator is positioned in one or more of the arms of the Mach Zehnder modulator. Several modulation schemes may be enabled using NOEMS phase modulators, including for example amplitude shift keying (ASK), quadrature amplitude modulation (QAM), phase shift keying (BPSK), quadrature phase shift keying (QPSK) and higher order QPSK, offset quadrature phase-shift keying (OQPSK), Dual-polarization quadrature phase shift keying (DPQPSK), amplitude phase shift keying (APSK), etc. Additionally, NOEMS phase modulators may be used as phase correctors in applications in which the phase of an optical signal tends to drift unpredictably. In some embodiments, NOEMS phase modulators of the types described herein may be used as part of a photonic processing system.

Figure 10A:
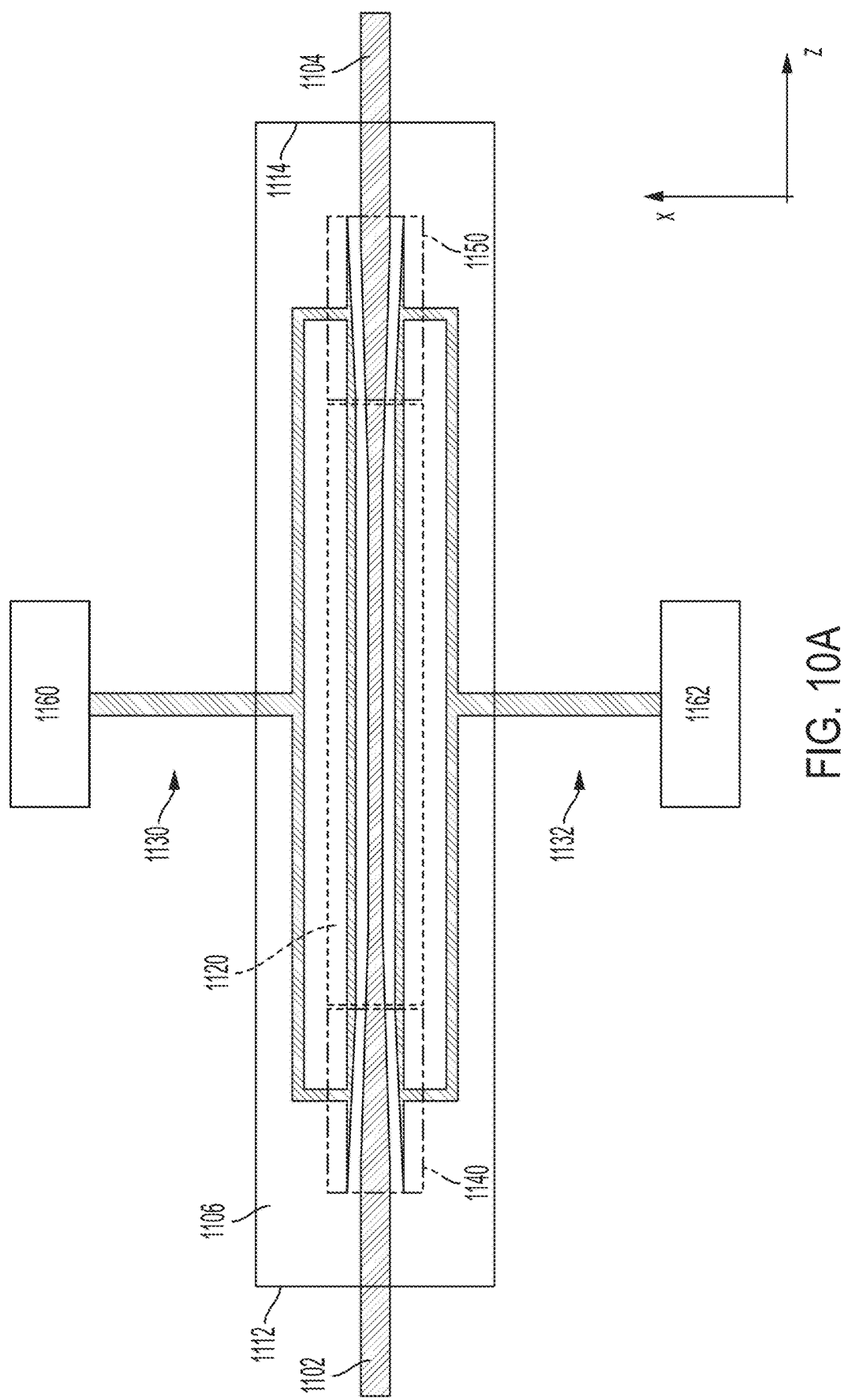
FIG. 10A is a top view illustrating schematically a Nano-Opto-Electromechanical Systems (NOEMS) phase modulator, in accordance with some embodiments of the technology described herein.

FIG. 10A is a top view illustrating schematically a Nano-Opto-Electromechanical Systems (NOEMS) phase modulator, in accordance with some non-limiting embodiments. NOEMS phase modulator 1000 includes input waveguide 1102, output waveguide 1104, input transition region 1140, output transition region 1150, suspended multi-slot optical structure 1120, mechanical structures 1130 and 1132, and mechanical drivers 1160 and 1162. NOEMS phase modulator 1000 may be fabricated using silicon photonic techniques. For example, NOEMS phase modulator 1000 may be fabricated on a silicon substrate, such as a bulk silicon substrate or a silicon-on-insulator (SOI) substrate. In some embodiments, NOEMS phase modulator 1000 may further include electronic circuitry configured to control the operations of mechanical drivers 1160 and 1162. The electronic circuitry may be fabricated on the same substrate hosting the components of FIG. 10A, or on a separate substrate. When disposed on a separate substrate, the substrates may be bonded to one another in a any suitable way, including 3D-bonding, flip-chip bonding, wire bonding etc.

At least part of NOEMS phase modulator 1000 is formed in a trench 1106. As will be described in detail further below, trenches of the types described herein may be formed by etching a portion of the cladding. In the example of FIG. 10A, trench 1106 has a rectangular shape, though trenches of any other suitable shape may be used. In this example, trench 1106 has four sidewalls. Sidewalls 1112 and 1114 are spaced from one another along the z-axis (referred to herein as the propagation axis), and the other two sidewalls (not labeled in FIG. 10A) are spaced from one another along the x-axis.

In some embodiments, the separation along the z-axis between sidewalls 1112 and 1114 may be less than or equal to 50 µm, less than or equal to 30 µm, or less than or equal to 20 µm. Thus, the modulation region of this NOEMS phase modulator is significantly shorter than other types of phase modulators, which require several hundreds of microns for modulating the phase of an optical signal. The relatively short length is enable by one or more of the following factors. First, having multiple slots improves coupling to the optical modulation region, which in turn enables a reduction in the length of the transition region. The improved coupling may be the result of enhanced mode symmetry in the multi-slot structure. Second, decoupling the mechanical drivers from the optical modulation region enables a greater modulation per unit length, and as a result a shorter modulation region.

During operation, an optical signal may be provided to input waveguide 1102. In one example, the optical signal may be a continuous wave (CW) signal. Phase modulation may take place in suspended multi-slot optical structure 1120. A phase modulated optical signal may exit NOEMS phase modulator 1000 from output waveguide 1104. Transition region 1140 may ensure loss-free or nearly loss-free optical coupling between input waveguide 1102 and suspended multi-slot optical structure 1120. Similarly, transition region 1150 may ensure loss-free or nearly loss-free optical coupling between suspended multi-slot optical structure 1120 and output waveguide 1104. Transitions regions 1140 and 1150 may include tapered waveguides in some embodiments, as described in detail further below. As discussed above, the length of the transitions regions may be shorter relative to other implementations.

The input optical signal may have any suitable wavelength, including but not limited to a wavelength in the O-band, E-band, S-band, C-band or L-band. Alternatively, the wavelength may be in the 850 nm-band or in the visible band. It should be appreciated that NOEMS phase modulator 1000 may be made of any suitable material, so long as the material is transparent or at least partially transparent at the wavelength of interest, and the refractive index of the core region is greater than the refractive index of the surrounding cladding. In some embodiments, NOEMS phase modulator 1000 may be made of silicon. For example, input waveguide 1102, output waveguide 1104, input transition region 1140, output transition region 1150, suspended multi-slot optical structure 1120, and mechanical structures 1130 and 1132 may be made of silicon. Given silicon's relatively low optical bandgap (approximately 1.12 eV), silicon may be particularly suitable for use in connection with near infrared wavelengths. In another example, NOEMS phase modulator 1000 may be made of silicon nitride or diamond. Given silicon nitride's and diamond's relatively high optical bandgaps (approximately 5 eV and approximately 5.47 eV, respectively), these materials may be particularly suitable for use in connection with visible wavelengths. However, other materials are also possible, including indium phosphide, gallium arsenide, and or any suitable III-V or II-VI alloy.

In some embodiments, input waveguide 1102 and output waveguide 1104 may be sized to support a single mode at the wavelength of operation (though multi-mode waveguides can also be used). For example, if a NOEMS phase modulator is designed to operate at 1550 nm (though of course, not all embodiments are limited in this respect), input and output waveguides 1102 and 1104 may support a single mode at 1550 nm. In this way, the mode confinement within the waveguide may be enhanced, thus reducing optical losses due to scattering and reflections. Waveguides 1102 and 1104 may be rib waveguides (e.g., with rectangular cross sections) or may have any other suitable shape.

As described above, part of NOEMS phase modulator 1000 may be formed within a trench 1106, so that the waveguides in the modulation region are surrounded by air and are free to move in space. The drawback of including a trench is the formation of a cladding/air interface and an air/cladding interface along the propagation path. Thus, the input optical signal passes a cladding/air interface (in correspondence with sidewall 1112) before reaching the region where modulation occurs and passes an air/cladding interface (in correspondence with sidewall 1114) after the modulation region. These interfaces may introduce reflection losses. In some embodiments, reflection losses may be reduced by positioning transition region 1140 inside, rather than outside, trench 1106 (as shown in FIG. 10A). In this way, the mode expansion associated with the transition region takes place where the optical signal has already passed the cladding/air interface. In other words, the mode is tightly confined as it passes the cladding/air interface, but is expanded in the trench, using the transition region, for purposes of coupling to the suspended multi-slot structure 1120. Similarly, transition region 1150 may be formed inside trench 1106, thereby spatially re-confining the mode before it reaches sidewall 1114.

Figure 10B:
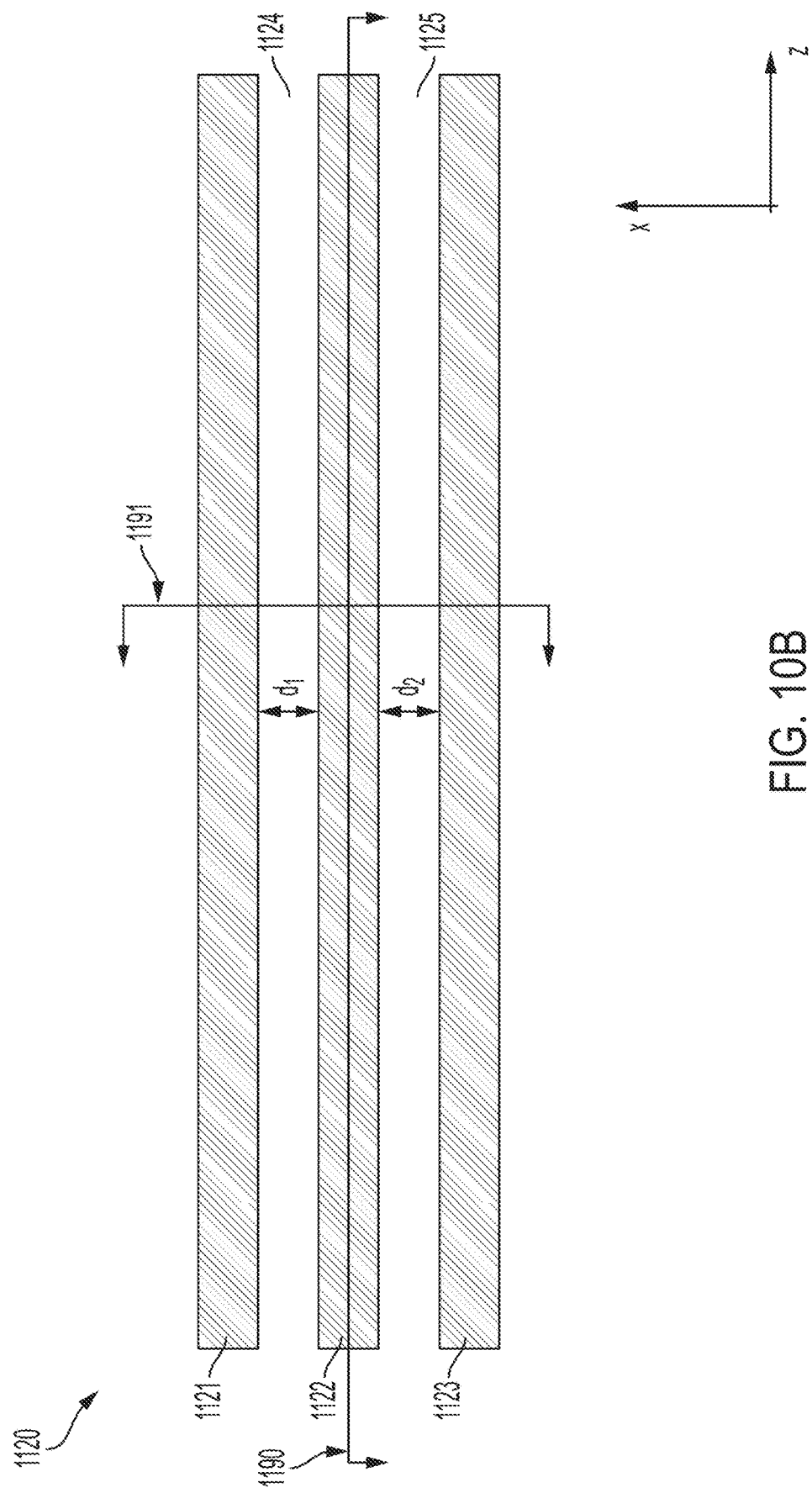
FIG. 10B is a top view illustrating schematically a suspended multi-slot optical structure of the NOEMS phase modulator of FIG. 10A, in accordance with some embodiments of the technology described herein.

FIG. 10B illustrates suspended multi-slot optical structure 1120 in additional detail, in accordance with some non-limiting embodiments. In the example of FIG. 10B, multi-slot optical structure 1120 includes three waveguides (1121, 1122 and 1123). Slot 1124 separates waveguide 1121 from waveguide 1122 and slot 1125 separates waveguide 1122 from waveguide 1123. The width of the slots ($d_1$ and $d_2$) may be less than the critical width (at the wavelength of operation) for forming slot modes, whereby a substantial portion of the mode energy (e.g., more than 40%, more than 50%, more than 60%, or more than 75%) is within the slots. For example, each of $d_1$ and $d_2$ may be equal to or less than 200 nm, equal to or less than 1150 nm, or equal to or less than 100 nm. The minimum width may be set by the photolithographic resolution.

Figure 10C:
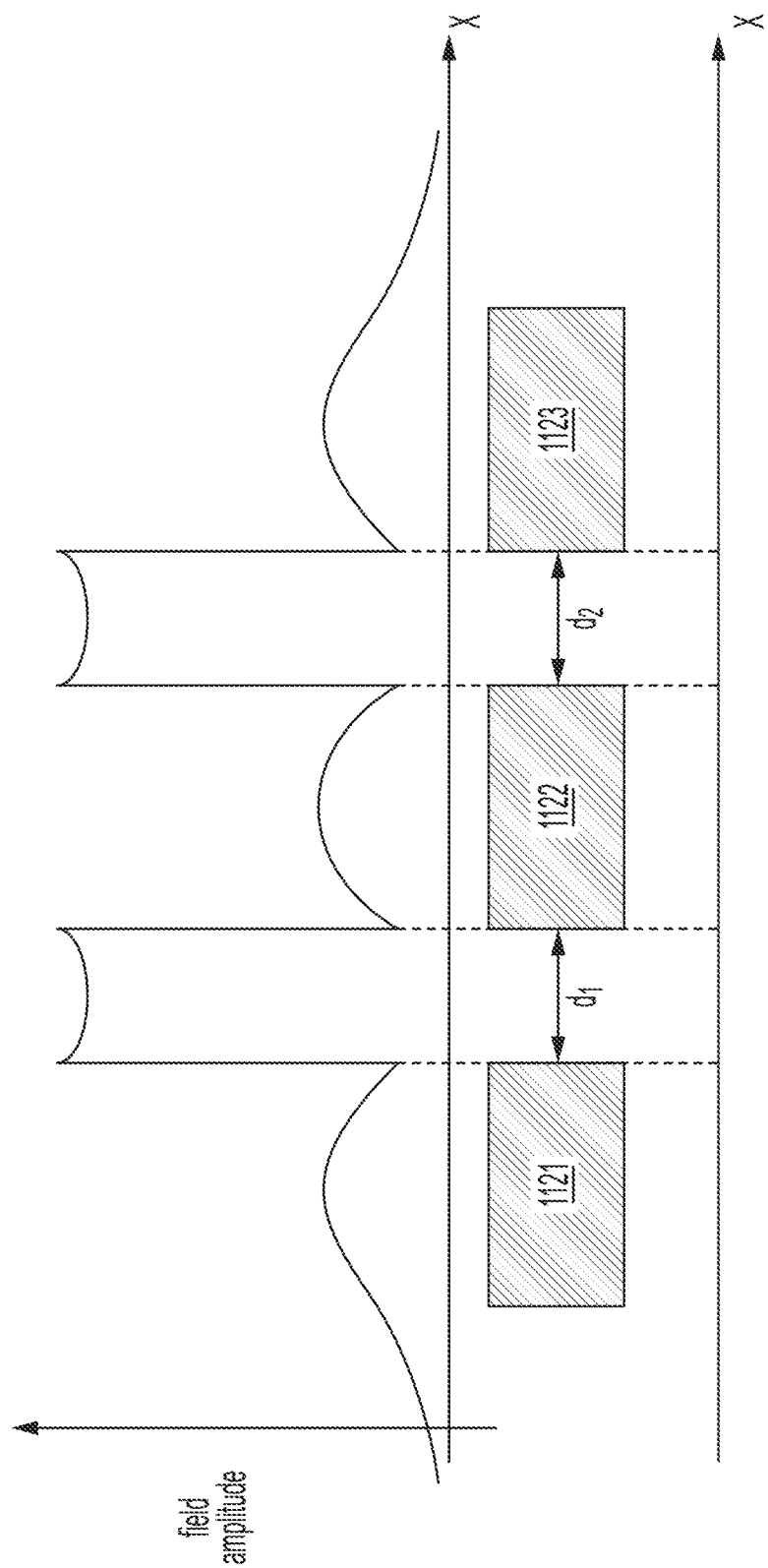
FIG. 10C is a plot illustrating an example of an optical mode arising in the suspended multi-slot optical structure of FIG. 10B, in accordance with some embodiments of the technology described herein.

FIG. 10C is a plot illustrating an example of an optical mode supported by the waveguides 1121, 1122 and 1123, in accordance with some non-limiting embodiments. More specifically, the plot illustrates the amplitude of a mode (e.g., the electric field $E_x$, $E_y$ or $E_z$, or magnetic field $H_x$, $H_y$ or $H_z$,). As illustrated, a substantial portion of the overall energy is confined within the slots, where the mode exhibits peaks of amplitude. In some embodiments, there is more optical energy in one of the slots than in any one of the individual waveguides. In some embodiments, there is more optical energy in one of the slots than in all the waveguides considered together. Outside the outer walls of the exterior waveguides, the mode energy decays (for example exponentially).

Widths $d_1$ and $d_2$ may be equal to, or different than, one another. The widths of the slots and the waveguides may be constant along the z-axis (as in FIG. 10B) or may vary. In some embodiments, the widths of waveguides 1121, 1122 and 1123 may be less than the width of input waveguide 1102. In some embodiments, when the wavelength of operation is in the C-band, the widths of waveguides 1121, 1122 and 1123 may be between 200 nm and 400 nm, between 250 nm and 350 nm, or within any other suitable range, whether within or outside such ranges.

While the example of FIG. 10B illustrates suspended a multi-slot optical structure 1120 with three waveguides and two slots, any other suitable number of waveguides and slots may be used. In other examples, a suspended multi-slot optical structure 1120 may include five waveguides and four slots, seven waveguides and six slots, nine waveguides and eight slots, etc. In some embodiments, the structure includes an odd number of waveguides (and consequently, an even number of slots) so that only symmetric modes are excited, while antisymmetric modes remain unexcited. The inventors have appreciated that enhancing the symmetry of the mode enhances coupling into the slotted structure, thus enabling a substantial reduction in the length of the transition region. However, implementations with even number of waveguides are also possible.

As will be described in detail further below, phase modulation occurs by causing the exterior waveguides (1121 and 1123 in FIG. 10B) to move relative to the center waveguide (1122 in FIG. 10B) along the x-axis. When waveguide 1121 moves in the x-axis relative to waveguide 1122, the width of slot 1124 varies, and the shape of the mode supported by the structure varies accordingly. The result is a change in the effective index of the mode supported by the structure, and consequently, a phase modulation takes place. Motion of the exterior waveguides may be induced using mechanical structures 1130 and 1132.

Figure 10D:
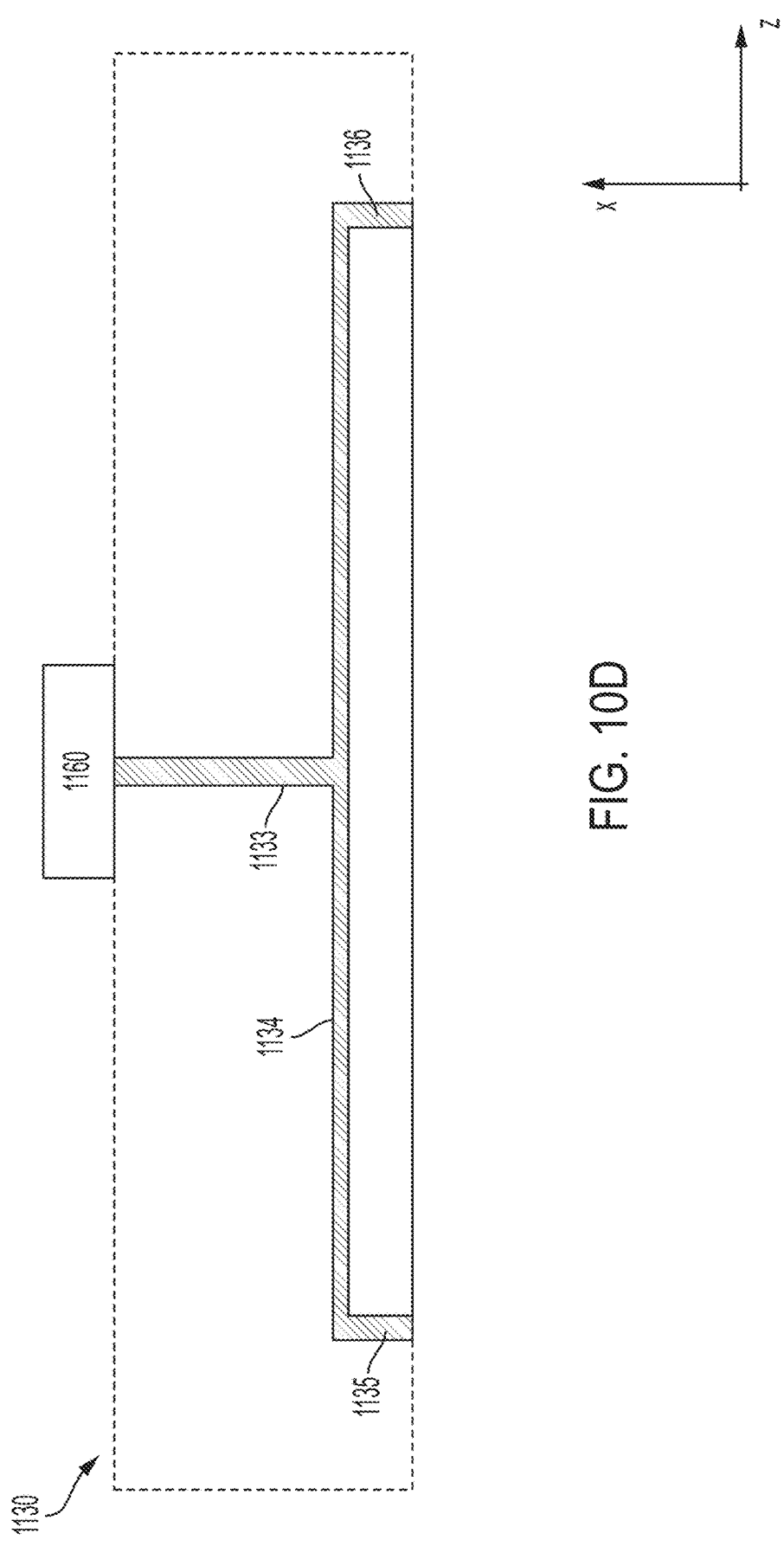
FIG. 10D is a top view illustrating schematically a mechanical structure of the NOEMS phase modulator of FIG. 10A, in accordance with some embodiments of the technology described herein.
Figure 10E:
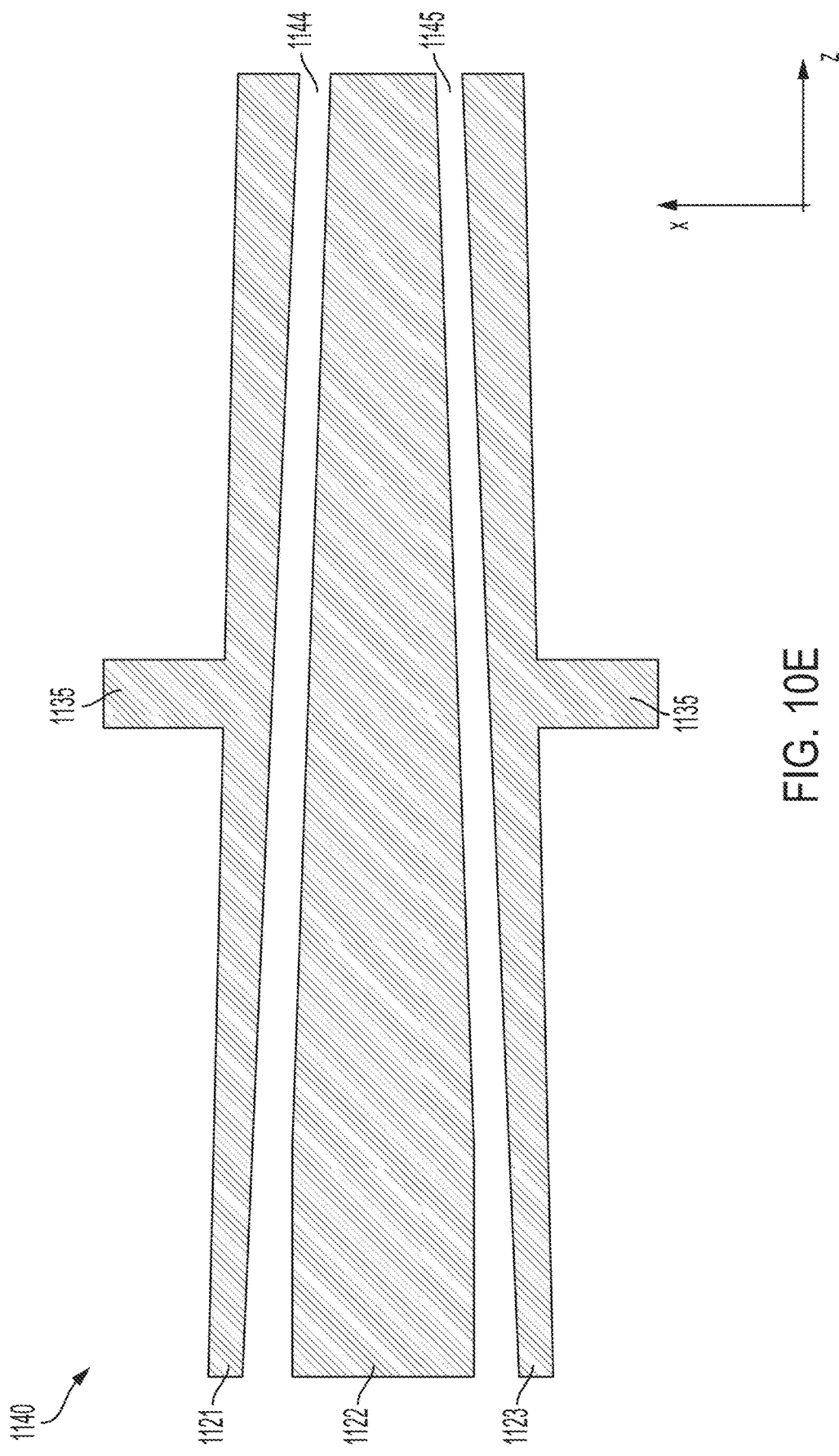
FIG. 10E is a top view illustrating schematically a transition region of the NOEMS phase modulator of FIG. 10A, in accordance with some embodiments of the technology described herein.

An example of a mechanical structure 1130 is illustrated in FIG. 10D, in accordance with some non-limiting embodiments. Mechanical structure 1132 (see FIG. 10A) may have a similar arrangement. In the example of FIG. 10D, mechanical structure 1130 includes beams 1133, 1134, 1135 and 1136. Beam 1133 connects mechanical driver 1160 to beam 1134. Beams 1135 and 1136 connect beam 1134 to the exterior waveguide. To limit optical losses, beams 1135 and 1136 may be attached to the exterior waveguide in the transition regions 1140 and 1150, respectively, rather than in the modulation region (as shown in FIG. 10E, which is discussed below). However, attaching beams 1135 and 1136 to the exterior waveguide to the modulation region is also possible. Beams with different shapes, sizes and orientations may be used in alternative or in addition to those illustrated in FIG. 10D.

Mechanical structure 1130 may transfer mechanical forces generated at mechanical driver 1160 to waveguide 1121, thereby causing waveguide 1121 to move relative to waveguide 1122. Mechanical drivers 1160 and 1162 may be implemented in any suitable way. In one example, the mechanical drivers may include piezoelectric devices. In one example, the mechanical drivers may include conductive fingers. When a voltage is applied between adjacent fingers, the fingers may experience acceleration, thus imparting a mechanical force to the mechanical structures. In some embodiments, the mechanical drivers may be driven with an electrical signal having a pattern encoded thereon. In this way, modulation results in the pattern being imparted onto the phase of an input optical signal.

It should be appreciated that, because the waveguides of suspended multi-slot optical structure 1120 are driven using external mechanical drivers, rather than being directly supplied with electrical signals as in certain conventional phase modulators, the conductivity of the waveguides can be relaxed, thus reducing free carrier absorption loss, and consequently, dynamic loss. This is different than some conventional phase modulators, where the waveguide itself is doped to act as a heater or a carrier accumulation region. In some embodiments, waveguides 1121, 1122 and 1123 may be made of an undoped, or low-doped, semiconductor material (e.g., undoped silicon or silicon with a doping concentration less than $10^{14}$ cm$^{-3}$). In some embodiments, the resistivity of the material forming the waveguides may be greater than 11300 Ωcm.

FIG. 10E illustrates an example of a transition region 1140, in accordance with some non-limiting embodiments. In this implementation, waveguide 1122 is contiguous to (e.g., is the continuation of) input waveguide 1102. As shown, waveguide 1122 is tapered in the transition region such that its width reduces as it approaches the suspended multi-slot optical structure 1120. By contrast, waveguides 1121 and 1123 are tapered in the transition region such that their widths increase as they depart from suspended multi-slot optical structure 1120. The tapered waveguides may allow adiabatic coupling between the mode of input waveguide 1102 and the mode of suspended multi-slot optical structure 1120, thereby limiting coupling losses. A similar arrangement may be used for transition region 1150. Due to the enhanced symmetry of the mode supported by the multi-slot structure, transition regions 1140 and 1150 are significantly shorter than other implementations. In some embodiments, the transition regions may be as short as 10 µm or less, or 5 µm or less, though other values are also possible.

Figure 11:
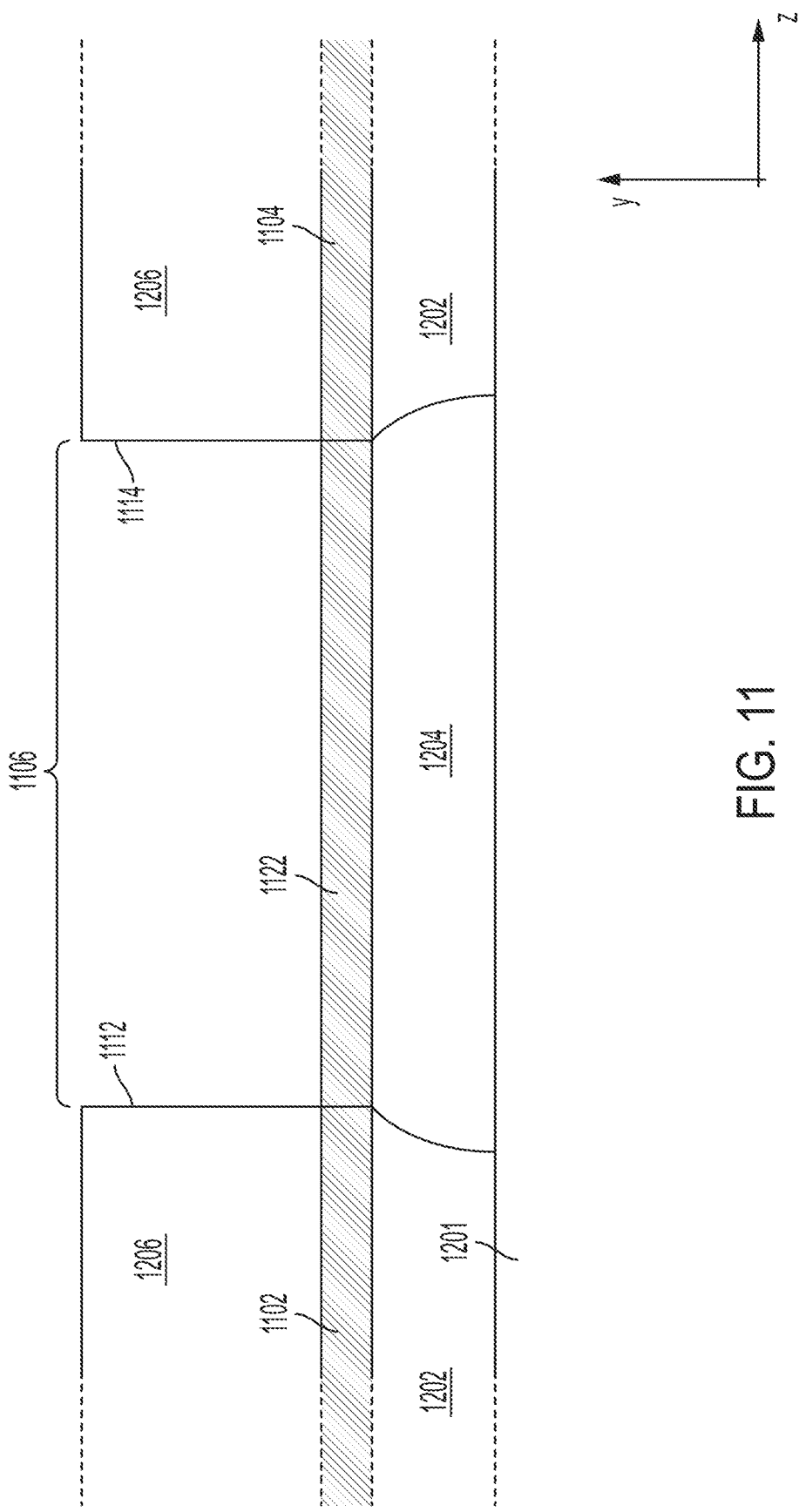
FIG. 11 is a cross-sectional view of the NOEMS phase modulator of FIG. 10A, taken in a yz-plane, and illustrating a suspended waveguide, in accordance with some embodiments of the technology described herein.

FIG. 11 is a cross sectional view of a NOEMS phase modulator 1000 taken in a yz-plane passing through waveguide 1122 (see plane 1190 in FIG. 10B), in accordance with some non-limiting embodiments. Input waveguide 1102 and output waveguide 1104 are surrounded by a cladding made of a material (e.g., silicon oxide) with a refractive index lower than the refractive index of the core material. Lower cladding 1202 is between the waveguide and the underlying substrate 1201. Upper cladding 1206 is formed over the waveguide.

To enable free motion of the waveguides of the suspended multi-slot optical structure 1120, a trench 1106 is formed through part of upper cladding 1206. In some embodiments, a portion of the lower cladding 1202 is removed under the suspended multi-slot optical structure 1120, thus forming an undercut 1204. As a result, waveguides 1121, 1122 and 1123 are suspended in air and are free to move responsive to mechanical forces. A cladding/air interface exists at trench sidewall 1112 and an air/cladding interface exists at trench sidewall 1114. The sidewalls may be substantially vertical, for example if the trench is formed by reaction ion etching (RIE), or may alternatively be angled. Undercut 1204 may have curved sidewalls, as illustrated in FIG. 11, if an isotropic etch is used, or may alternatively be substantially vertical. In some embodiments, trench 1106 and undercut 1204 may be formed as part of the same etch, while in other embodiments, they be formed using separate etches.

Figure 12:
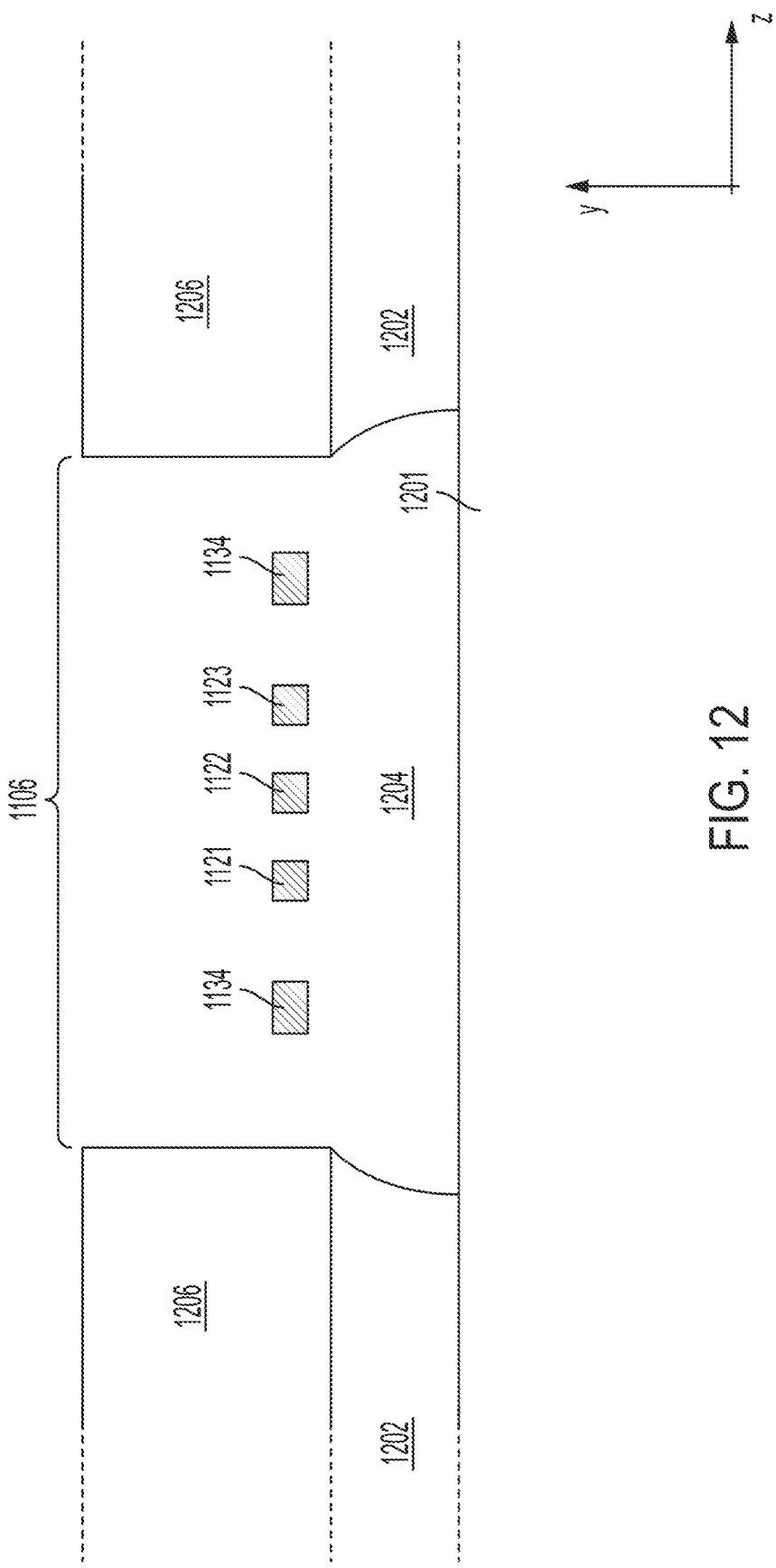
FIG. 12 is a cross-sectional view of the NOEMS phase modulator of FIG. 10A, taken in a xy-plane, and illustrating a portion of a suspended multi-slot optical structure, in accordance with some embodiments of the technology described herein.

FIG. 12 is a cross sectional view of a NOEMS phase modulator 1000 taken in a xy-plane passing through waveguides 1121, 1122 and 1123 (see plane 1191 in FIG. 10B), in accordance with some non-limiting embodiments. FIG. 12 shows that waveguides 1121, 1122 and 1123 and beams 1134, are co-planar (at least in this example), and are suspended in air above substrate 1201. As further illustrated in this figure, waveguides 1121, 1122 and 1123 do not contact lower cladding 1202 at this cross section. When mechanical drivers 1160 and 1162 are actuated, beams 1134 and waveguides 1121 and 1123 oscillate along the x-axis, thus varying the widths of the slots 1124 and 1125. An example of an oscillatory motion of waveguides 1121 and 1123 is illustrated, collectively, in FIGS. 13A-13C, in accordance with some non-limiting embodiments. FIG. 13A illustrates a case in which no mechanical force is applied. As a result, the widths of the slots are unperturbed. In FIG. 13B, a pair of forces is applied such that both waveguides 1121 and 1123 move towards waveguide 1122, as illustrated by the arrows. As a result, the widths of the slots are reduced. In FIG. 13C, a pair of forces is applied such that both waveguides 1121 and 1123 move away from waveguide 1122, also illustrated by the arrows. As a result, the widths of the slots are increased. In some embodiments, the forces may be applied in a periodic fashion, and/or following the pattern of the driving electrical signals. In some embodiments, the forces may be applied to waveguides 1121 and 1123 differentially, such that the same intensity is applied to both waveguides but with opposite signs.

Figure 14:
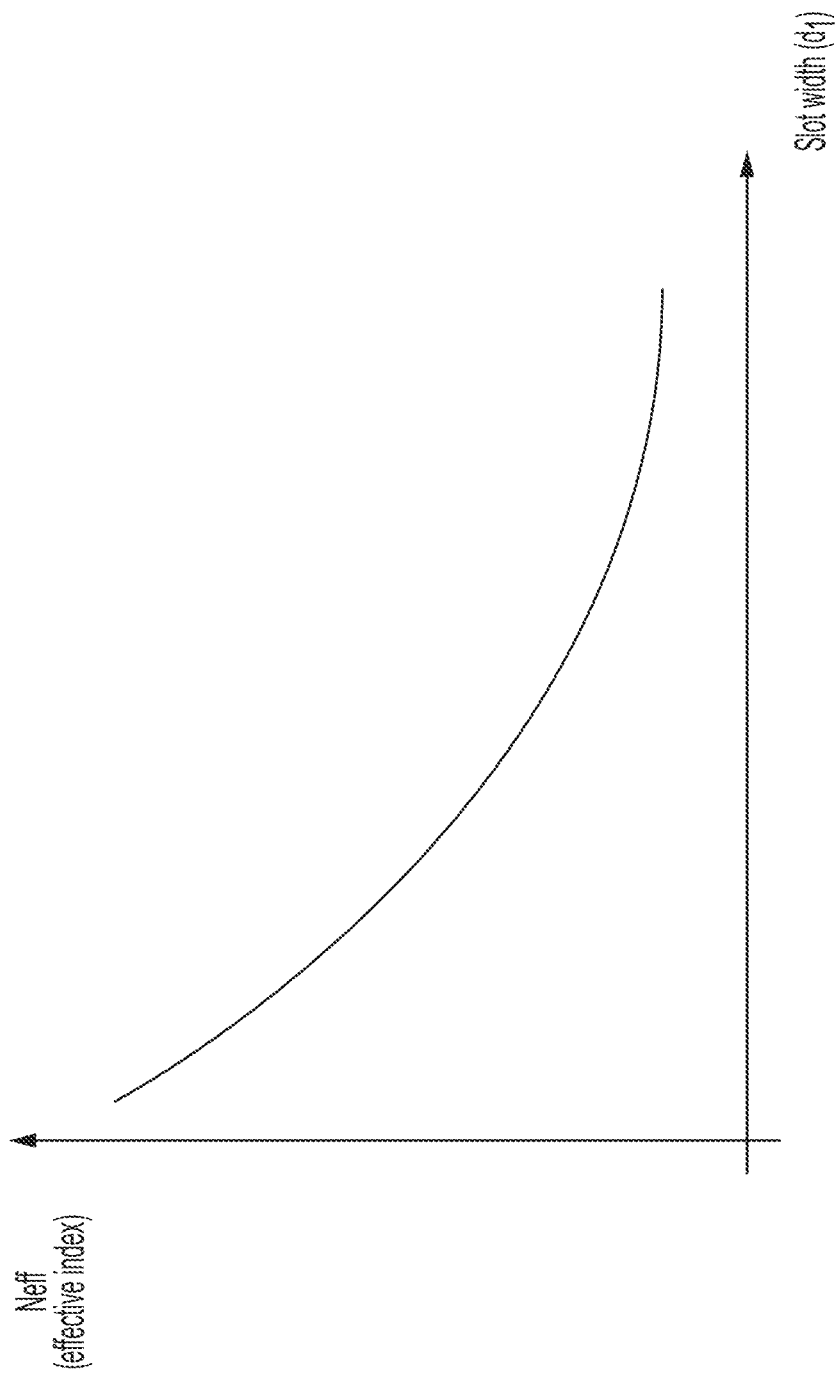
FIG. 14 is a plot illustrating how the effective index of a suspended multi-slot optical structure may vary as a function of the width of a slot, in accordance with some embodiments of the technology described herein.

FIG. 14 is a plot illustrating how the effective refractive index (Neff) of the mode propagating in the suspended multi-slot optical structure 1120 varies as a function of width $d_1$ (the width of the slot between waveguides 1121 and 1122), in accordance with some non-limiting embodiments. A similar response may be plotted as a function of $d_2$. The effective index variation is caused by the fact that, as the separation between the waveguides varies under the effect of an applied mechanical force, the shape of the mode deviates relative to the one illustrated in FIG. 10C. As the width varies over time, so does the mode effective index, and consequently, the phase of the mode.

Figure 15:
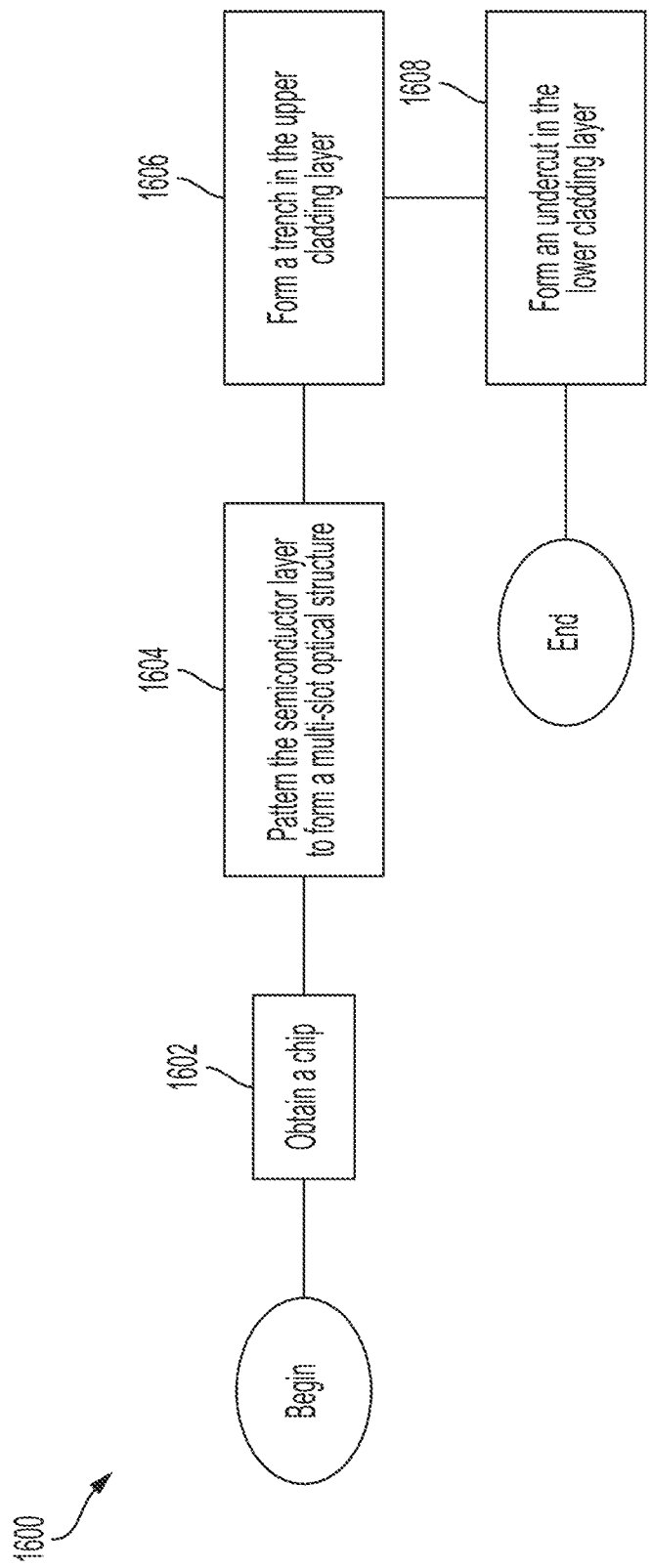
FIG. 15 is a flowchart illustrating an example of a method for fabricating a NOEMS phase modulator, in accordance with some embodiments of the technology described herein.

FIG. 15 is a flowchart illustrating an example of a method for fabricating a NOEMS phase modulator, in accordance with some non-limiting embodiments. It should be appreciated that the steps of the method described below may be performed in any suitable order, as fabrication processes are not limited to the specific order illustrated in FIG. 15.

Fabrication method 1600 begins at step 1602, in which a chip is obtained. In some embodiments, the chip may be a silicon-on-insulator chip, or a bulk silicon chip. The chip may have a substrate and any of the following layers: a lower cladding layer, a semiconductor layer and an upper cladding layer. The lower cladding layer may comprise silicon oxide in some embodiments. The semiconductor layer may comprises silicon, silicon nitride and/or doped silicon oxide in some embodiments. The upper cladding layer may comprise the same material forming the lower cladding layer, or a different material. FIG. 12. Illustrates an examples of a substrate (substrate 1201) having a lower cladding layer (cladding 1202), a semiconductor layer (the layer of waveguides 1121, 1122 and 1123) and an upper cladding layer (cladding 1206). It should be appreciated that any of the layers identified above may already be present on the chip when the chip arrives at the fabrication facility (where the NOEMS phase modulator is fabricated), or may be formed at the facility as part of the fabrication process.

At step 1604, the semiconductor layer is patterned form a multi-slot optical structure having first and second slots (or any other number of slots greater than two). In the example of FIG. 12, waveguides 1121, 1122 and 1123 may be formed at step 1604. Patterning the semiconductor layer may involve deposition of a photoresist layer, a photolithographic exposure and etching through the semiconductor layer. In some embodiments, any one of mechanical structures 1130 and 1132, mechanical drivers 1160 and 1162, waveguides 1102 and 1104 and transition regions 1140 and 142 (see FIG. 10A) are fabricated as part of the same photolithographic exposure, though not all embodiments are limited in this respect as one or more separate photolithographic exposures may be used. In some embodiments, at step 1604, mechanical drivers 1160 may be doped, for example using ion implantation. In some embodiments, the multi-slot optical structure may remain undoped.

At step 1606, a trench may be formed through the upper cladding layer. An example of a trench (trench 1106) is illustrated at FIG. 12. The trench may be formed, for example, using a dry etch such as a reactive ion etch. However, wet etches may alternatively or additionally be used. Formation of the trench may involve removal of a portion of the upper cladding layer in a region above the multi-slot optical structure formed at step 1604. As a result, the multi-slot optical structure may be exposed, partially or entirely, to air.

At step 1608, an undercut may be formed in the lower cladding layer. An example of an undercut (undercut 1204) is illustrated at FIG. 12. The undercut may be formed, for example, using a wet etch, though dry etches may alternatively or additionally be used. Formation of the undercut may involve removal of a portion of the lower cladding layer in a region under the multi-slot optical structure. As a result, at least part of the multi-slot optical structure may be suspended over air.

VI. Conclusion

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A photonic package comprising:
   a photonic chip having a plurality of photonic microelectromechanical system (MEMS) modulators configured to modulate light;
   an application specific integrated circuit (ASIC) disposed on the photonic chip such that the ASIC is stacked on top of the plurality of photonic MEMS modulators, the ASIC being in electrical communication with the plurality of photonic MEMS modulators; and
   an interposer disposed between the photonic chip and the ASIC.

2. The photonic package of claim 1, wherein the interposer comprises a silicon interposer.

3. The photonic package of claim 1, further comprising a non-conductive film disposed between the photonic chip and the ASIC, the non-conductive film being patterned with a plurality of recesses, wherein the plurality of recesses are aligned with respective photonic MEMS modulators of the photonic chip.

4. The photonic package of claim 3, further comprising a plurality of conductive pillars electrically connecting the ASIC with the plurality of photonic MEMS modulators, wherein the plurality of conductive pillars pass through the non-conductive film.

5. The photonic package of claim 1, wherein at least one of the plurality of photonic MEMS modulators comprises a photonic phase modulator.

6. The photonic package of claim 1, wherein at least one of the plurality of photonic MEMS modulators comprises a suspended optical waveguide.

7. The photonic package of claim 1, wherein the photonic chip is positioned in a depression formed on a circuit board.

8. The photonic package of claim 1, further comprising an optical fiber edge-coupled to the photonic chip and configured to provide the light to the plurality of photonic MEMS modulators.

9. The photonic package of claim 8, further comprising a laser coupled to the optical fiber.

10. The photonic package of claim 1, wherein the photonic chip further comprises a silicon photonic integrated circuit.

11. The photonic package of claim 1, wherein the ASIC comprises a driver configured to cause motion of at least one of the plurality of photonic MEMS modulators.

* * * * *